United States Patent [19]

Smith et al.

[11] Patent Number: 5,730,784

[45] Date of Patent: Mar. 24, 1998

[54] PROCESS FOR THE REMOVAL OF HYDROGEN SULFIDE FROM A GAS STREAM

[75] Inventors: James W. Smith, Toronto; David Todd R. Ellenor, Pickering; John N. Harbinson, Scarborough, all of Canada

[73] Assignees: The University of Toronto Innovations Foundation; Apollo Environmental Systems Corp., Canada

[21] Appl. No.: 462,692

[22] Filed: Jun. 5, 1995

Related U.S. Application Data

[63] Continuation of Ser. No. 313,153, Apr. 5, 1993, Pat. No. 5,520,818, which is a continuation-in-part of Ser. No. 863,720, Apr. 3, 1992, Pat. No. 5,352,421, which is a continuation-in-part of Ser. No. 622,485, Dec. 5, 1990, Pat. No. 5,174,973, which is a continuation-in-part of Ser. No. 582,423, Sep. 14, 1990, abandoned, which is a continuation-in-part of Ser. No. 446,776, Dec. 6, 1989, abandoned.

[30] Foreign Application Priority Data

Apr. 8, 1993 [WO] WIPO .................. PCT/CA93/00148

[51] Int. Cl.⁶ .................. C01B 17/16; B01D 21/20
[52] U.S. Cl. .................. 95/181; 95/261; 210/750; 210/758; 210/787; 261/84; 423/224; 423/242.1
[58] Field of Search .................. 426/220, 224, 426/226, 576.4, 576.6; 422/168; 210/221.1, 221.2, 242.2, 703, 704, 758, 787; 261/84; 423/224, 242.1, 242.2; 95/181, 261

[56] References Cited

U.S. PATENT DOCUMENTS

| | | |
|---|---|---|
| 2,274,658 | 3/1942 | Booth . |
| 2,294,827 | 9/1942 | Booth . |
| 2,659,691 | 11/1953 | Gislon et al. .................. 208/207 |
| 3,273,865 | 9/1966 | White . |
| 3,341,450 | 9/1967 | Ciabatttari et al. .................. 210/758 |
| 3,647,069 | 3/1972 | Bailey .................. 210/221.1 |
| 3,796,678 | 3/1974 | Sen .................. 210/758 |
| 3,911,093 | 10/1975 | Sherif et al. . |
| 3,915,391 | 10/1975 | Mercade .................. 209/166 |
| 3,925,230 | 12/1975 | Koeptle et al. .................. 252/136 |
| 3,956,460 | 5/1976 | Brocoff .................. 423/226 |
| 3,959,452 | 5/1976 | Espencheid et al. .................. 423/224 |
| 3,979,282 | 9/1976 | Cundy .................. 209/166 |
| 3,993,563 | 11/1976 | Degner . |
| 4,009,251 | 2/1977 | Meuly . |

(List continued on next page.)

FOREIGN PATENT DOCUMENTS

| | | |
|---|---|---|
| 1212819 | 10/1986 | Canada . |
| 086919 | 8/1983 | European Pat. Off. . |
| 3712007 | 10/1988 | Germany . |
| WO-A-9108038 | 6/1991 | WIPO . |

OTHER PUBLICATIONS

"Development of Self-inducing Dispenser for Gas/Liquid and Liquid/Liquid Systems" by Koen et al, Proceeding of the Second European Conference on Mixing, 30th Mar.—1st Apr. 1977.

"Outokumpu Flotation Machines" by K. Fallenius, in Chapter 29 of Flotation, ed. M.C. Fuerstenau, AIMM, PE Inc, New York 1976.

"Flotation Machines and Equipment" in Flotation Agents and Processes, Chemical Technology Review #172, M.M. Ranney, Editor, 1980.

Chemical Abstracts, vol. 81, No. 8, 1974, (Columbus, Ohio, US), p. 242, abstract 41073s & JP, A, 7385475 (Tabata Kagaku Co. Ltd) 13 Nov. 1973.

*Primary Examiner*—David A. Reifsnyder
*Attorney, Agent, or Firm*—Sim & McBurney

[57] ABSTRACT

Hydrogen Sulfide is substantially completely removed from a gas stream in a two-stage operation. Hydrogen Sulfide is first partially oxidized to sulfur dioxide and the sulfur dioxide reacted with part of the remaining hydrogen sulfide while the hydrogen sulfide not so reacted is subsequently oxidized, thereby removing all of the hydrogen sulfide from the gas stream.

4 Claims, 2 Drawing Sheets

U.S. PATENT DOCUMENTS

| | | | |
|---|---|---|---|
| 4,036,942 | 7/1977 | Sibeud et al. | 423/226 |
| 4,255,262 | 3/1981 | O'Cheskey et al. | 210/221.2 |
| 4,442,083 | 4/1984 | Canales et al. | |
| 4,452,766 | 6/1984 | Pike | 423/421 |
| 4,525,338 | 6/1985 | Klee, Jr. | 423/576.2 |
| 4,534,952 | 8/1985 | Rapson et al. | 210/754 |
| 4,552,747 | 11/1985 | Goar. | |
| 4,576,708 | 3/1986 | Oko et al. | 208/408 |
| 4,618,427 | 10/1986 | Venas | 210/758 |
| 4,648,973 | 3/1987 | Hultholm et al. | 210/758 |
| 4,649,032 | 3/1987 | Snavely, Jr. et al. | 423/226 |
| 4,666,611 | 5/1987 | Kaelin | 210/758 |
| 4,683,062 | 7/1987 | Krovak et al. | 210/617 |
| 4,737,272 | 4/1988 | Szatkowski et al. | 210/703 |
| 4,789,469 | 12/1988 | Cvitas et al. | 210/150 |
| 4,808,385 | 2/1989 | Grinstead | 423/228 |
| 4,824,645 | 4/1989 | Jones et al. | 423/226 |
| 4,889,701 | 12/1989 | Jones et al. | 423/220 |
| 4,919,914 | 4/1990 | Smith et al. | 423/576.2 |
| 4,959,183 | 9/1990 | Jameson | 209/169 |
| 5,047,218 | 9/1991 | Ortega et al. | 423/224 |

5,730,784

PROCESS FOR THE REMOVAL OF HYDROGEN SULFIDE FROM A GAS STREAM

REFERENCE TO RELATED APPLICATION

This application is a continuation of U.S. patent application Ser. No. 08/313,153 filed Apr. 5, 1993, now U.S. Pat. No. 5,520,818 which application is a continuation-in-part of U.S. patent application Ser. No. 863,720 filed Apr. 3, 1992, (now U.S. Pat. No. 5,352,421) after 1992 which itself is a continuation-in-part of U.S. patent application Ser. No. 622,485 filed Dec. 5, 1990 (now U.S. Pat. No. 5,174,973) which itself is a continuation-in-part of U.S. patent application Ser. No. 582,423 filed Sep. 14, 1990 (now abandoned) which itself is a continuation-in-part of U.S. patent application Ser. No. 446,776 filed Dec. 6, 1989 (now abandoned).

FIELD OF INVENTION

The present invention relates to method and apparatus for effecting gas-liquid contacting, for example, for the removal of components from gas streams, in particular by chemical conversion or removal of gaseous components while in contact-with a liquid phase or slurry, or for the removal of components from a liquid phase, in particular, for the chemical conversion or removal of components from a liquid phase while in contact with the gaseous phase.

BACKGROUND TO THE INVENTION

Procedures for effecting contact between a gas phase and a liquid phase have been devised for a variety of purposes, for example, to remove a component from the gas or liquid phase. In this regard, many gas streams contain components which are undesirable and which need to be removed from the gas stream prior to its discharge to the atmosphere or to further processing. One such gaseous component is hydrogen sulfide, while another such component is sulfur dioxide.

Hydrogen sulfide occurs in varying quantities in many gas streams, for example, in sour natural gas streams and in tail gas streams from various industrial operations. Hydrogen sulfide is odiferous, highly toxic and a catalyst poison for many reactions and hence it is desirable and often necessary to remove hydrogen sulfide from such gas streams.

There exist several commercial processes for effecting hydrogen sulfide removal. These include processes, such as absorption in solvents, in which the hydrogen sulfide first is removed as such and then converted into elemental sulfur in a second distinct step, such as in a Claus plant. Such commercial processes also include liquid phase oxidation processes, such as Stretford, LO-CAT, Unisulf, SulFerox, Hiperion and others, whereby the hydrogen sulfide removal and conversion to elemental sulfur normally are effected in reaction and regeneration steps.

In Canadian Patent No. 1,212,819 and its corresponding U.S. Pat. No. 4,919,914, the disclosure of which is incorporated herein by reference, there is described a process for the removal of hydrogen sulfide from gas streams by oxidation of the hydrogen sulfide at a submerged location in an agitated flotation cell in intimate contact with an iron chelate solution and flotation of sulfur particles produced in the oxidation from the iron chelate solution by hydrogen sulfide-depleted gas bubbles.

The combustion of sulfur-containing carbonaceous fuels, such as fuel oil, fuel gas, petroleum coke and coal, as well as other processes, produces an effluent gas stream containing sulfur dioxide. The discharge of such sulfur dioxide-containing gas streams to the atmosphere has lead to the incidence of the phenomenon of "acid rain", which is harmful to a variety of vegetation and other-life forms. Various proposals have been made to decrease such emissions.

A search in the facilities of the United States Patent and Trademark Office with respect to gas-liquid contacting procedures has revealed the following United States patents as the most relevant-to the present invention:

| | |
|---|---|
| U.S. Pat. No. 2,274,658 | U.S. Pat. No. 2,294,827 |
| U.S. Pat. No. 3,273,865 | U.S. Pat. No. 4,683,062 |
| U.S. Pat. No. 4,789,469 | |

U.S. Pat. Nos. 2,274,658 and 2,294,827 (Booth) describe the use of an impeller to draw gas into a liquid medium and to disperse the gas as bubbles in the liquid medium for the purpose of removing dissolved gaseous materials and suspended impurities from the liquid medium, particularly a waste stream from rayon spinning, by the agitation and aeration caused by distribution of the gas bubbles by the impeller.

The suspended solids are removed from the liquid phase by froth flotation while the dissolved gases are stripped out of the liquid phase. The process described in this prior art is concerned with contacting liquid media in a vessel for the purpose of removing components from the liquid phase by the physical actions of stripping and flotation.

These references contain no discussion or suggestion for removal of components from gas streams by introduction to a liquid phase or the treatment of components dissolved or suspended in the liquid phase by chemical interaction with components of the gas phase. In addition, the references do not describe any critical combination of impeller-shroud parameters for effecting such removal, as required herein.

U.S. Pat. No. 3,273,865 describes an aerator for sewage treatment. A high speed impeller in the form of a stack of flat discs forms a vortex in the liquid to draw air into the aqueous phase and circulate the aqueous phase. As in the case of the two Booth references, this prior art does not describe or suggest an impeller-shroud combination for effecting the removal of components from a liquid phase or gaseous phase, as required herein.

U.S. Pat. No. 4,683,062 describes a perforated rotatable body structure which enables liquid-solid contact to occur to effect biocatalytic reactions. This reference does not describe an arrangement in which gas-liquid contact is effected.

U.S. Pat. No. 4,789,469 describes the employment of a series of rotating plates to introduce gases to or remove gases from liquids. There is no description or suggestion of an impeller-shroud combination, as required herein.

In addition, during the course of prosecution of pre-cursor U.S. patent applications, a number of other references has been cited, identified in such filings. The relevance of such prior art is discussed in such prosecution.

Many other gas-liquid contactors and flotation devices are described in the literature, for example:

(a) "Development of Self-Inducing Dispenser for Gas/Liquid and Liquid/Liquid Systems" by Koen et al, Proceeding of the Second European Conference on Mixing, 30th Mar.–1st April 1977;

(b) Chapter entitled "Outokumpu Flotation Machines" by K. Fallenius, in Chapter 29 of "Flotation", ed. M.C. Fuerstenau, AIMM, PE Inc, New York 1976; and (c) Chapter entitled "Flotation Machines and Equipment" in "Flotation Agents and Processes, Chemical Technology Review #172", M. M. Ranney, Editor, 1980.

However, none of this prior art describes the impeller-shroud structure used herein.

SUMMARY OF THE INVENTION

In the present invention, a novel procedure is provided for effecting gas-liquid contact between a gas and a liquid which employs a rotary impeller and shroud combination operated under specific conditions to effect rapid mass transfer between gaseous and liquid phases and excellent agitation of the liquid phase, by the pumping action of the rotary impeller, and thereby achieve an enhanced efficiency of removal of a component from the gas or liquid phase or transfer of a component from one phase to the other by chemical reaction, adsorption, absorption or desorption.

In one aspect of the present invention, there is provided a method for the distribution of a gaseous phase in a liquid phase using a rotary impeller comprising a plurality of blades at a submerged location in the liquid phase surrounded by a shroud through which are formed a plurality of openings.

The impeller is rotated about a substantially vertical axis at the submerged location within the liquid phase at a blade tip velocity of at least about 350 in/sec (at least about 9 m/s), preferably at least about 500 in/sec (preferably at least about 12.5 m/s), for example, up to and greater than about 700 in/sec (up to and greater than about 18 m/s), and draws liquid phase to the interior of the shroud effecting vigorous circulation of liquid phase through the impeller and shroud combination.

A gaseous phase is fed to the submerged location and the shear forces between the impeller blades and the plurality of openings in the shroud distributes the gaseous phase in the liquid phase as bubbles to the interior of the shroud and to form a gas-liquid mixture of bubbles of the gaseous phase in liquid phase contained within the shroud and to effect intimate contact of gas and liquid phases at the submerged location while effecting shearing of the gas-liquid mixture within the shroud and initiating and sustaining rapid mass transfer.

The gas-liquid mixture flows from within the shroud through and in contact with the openings therein to external of the shroud at a gas velocity index (GVI) of at least about 18 per second per opening, preferably at least about 24 per second per opening which causes further shearing of the gas liquid mixture and further intimate contact of gaseous phase and liquid phase.

The gas velocity index (GVI) is determined by the expression:

$$GVI = \frac{QP}{4nA^2}$$

where Q is the volumetric flow rate of gas (m³/s), n is the number of openings in the shroud, A is the area of the opening (m²) and P is the length of the perimeter of the opening (m).

An important operating parameter of the process is the relationship of the shroud diameter relative to the impeller diameter for a given GVI and impeller tip speed and this parameter may be termed the Effective Shear Index (ESI). The ESI is determined by the expression:

$$ESI = \frac{GVI}{V_i} \times \frac{(D_s - D_i)}{2} \times 100$$

wherein GVI is the gas velocity index (/s), $V_i$ is the impeller blade tip velocity (m/s), and $D_s$ and $D_i$ are inside diameter of the shroud and outside diameter of the impeller respectively (m). In general, the method of the invention may be carried out at an ESI value from about 1 to about 2500, preferably from about 10 to about 250, optimally about 50.

Another important operating parameter of the process of the invention is the relationship of the impeller diameter and height for a given volumetric gas flow rate and impeller tip speed and this paramter may be termed the Shear Effectiveness Index (SEI). The SEI is determined by the relationship:

$$SEI = \frac{Q}{\pi h D_i V_i} \times 100$$

wherein Q is the volumetric gas flow rate into the impeller (m³/s), h is the height of the impeller blades (m), $D_i$ is the outside diameter of the impeller (m) and $V_i$ is the impeller blade tip velocity (m/s). The present invention generally employs an SEI value in the range of about 1 to about 10 and preferably about 2 to about 5. These parameters apply to self-induced systems without internal baffles as described in U.S. Pat. No. 3,993,563 (Degner) and/or to those with externally-sparged gas. The ESI and SEI values employed herein preferably are determined for impeller tip speed velocities of at least about 500 in/sec (at least about 12.5 m/s).

In a further aspect of the invention, there is provided a method for the distribution of a gaseous phase in a liquid phase, which comprises providing a rotary impeller comprising a plurality of blades at a submerged location in the liquid phase surrounded by a shroud through which are formed a plurality of openings; feeding the gaseous phase to the submerged location; rotating the impeller about a substantially vertical axis at a speed corresponding to a tip speed ($V_i$) of at least about 500 in/sec. (at least about 12.5 m/s) and in such manner as to establish a Shear Effectiveness Index (SEI) value of about 1 to about 10, wherein the SEI value is determined by the relationship:

$$SEI = \frac{Q}{\pi h D_i V_i} \times 100$$

wherein Q is the gas flow rate into the impeller (m³/s), h is the height (m) of the impeller blades, $D_i$ is the outside diameter (m) of the impeller and $V_i$ is the blade tip velocity (m/s), and so as to draw liquid phase into the interior of the shroud and to generate sufficient shear forces between the impeller and the plurality of openings in the shroud to distribute the gaseous phase as bubbles in the liquid phase to the interior of the shroud and to effect intimate contact of the gaseous phase and the liquid phase at the submerged location so as to form a gas-liquid mixture of bubbles of the gaseous phase in the liquid phase contained within the shroud while effecting shearing of the gas-liquid mixture within the shroud, flowing the gas-liquid mixture from within interior the shroud through and in contact with the openings to external of the shroud at an Effective Shear index (ESI) value of from about 1 to about 2500, wherein the ESI value is determined by the relationship:

$$ESI = \frac{GVI}{V_i} \times \frac{(D_s - D_i)}{2} \times 100$$

The gas velocity index (GVI) is determined by the expression:

$$GVI = \frac{QP}{4nA^2}$$

where Q is the volumetric flow rate of gas (m³/s), n is the number of openings in the shroud, A is the area of the opening (m²) and P is the length of the perimeter of the opening (m). $V_i$ is the blade tip velocity (m/s), $D_s$ is the inside diameter (m) of the shroud and $D_i$ is the outside diameter (m) of the impeller, so as to effect further shearing of the gas-liquid mixture and further intimate contact of the gaseous phase and the liquid phase.

The SEI and ESI indices also comprise useful parameters for scale up procedures and provide a range of feasible parameters. In this regard, for a given volumetric gas flow rate, the SEI value may be used to calculate impeller size while the ESI value is used to calculate shroud diameter. Accordingly, an additional aspect of the invention provides a method for determining the parameters of a gas-liquid contact apparatus for the removal of a component of a gas stream using an impeller-apertured shroud combination immersed in a liquid phase to which the gas stream is fed at a volumetric gas flow rate of Q to the impeller, which comprises quantifying the structural and operating parameters of the apparatus so as to provide a Shear Effectiveness Index (SEI) value of from about 1 to about 10, wherein the SEI value is determined by the relationship:

$$SEI = \frac{Q}{\pi h D_i V_i} \times 100$$

in which Q is the volumetric gas flow rate to the impeller (m³/s), h is the height (m) of the impeller blades, $D_i$ is the inside diameter (m) of the impeller and $V_i$ is the impeller blade tip velocity (m/s) and so as to provide an Effective Shear Index (ESI) value of from about 1 to about 2500, wherein the ESI value is determined by the relationship:

$$ESI = \frac{GVI}{V_i} \times \frac{(D_s - D_i)}{2} \times 100$$

in which GVI is the Gas Velocity Index (/s) through each aperture in the shroud, $V_i$ is the impeller tip speed velocity (m/s), $D_s$ is the inside diameter (m) of the shroud and $D_i$ is the outside diameter (m) of the impeller, where the gas velocity index (GVI) is determined by the expression:

$$GVI = \frac{QP}{4nA^2}$$

where Q is the volumetric flow rate of gas (m³/s), n is the number of openings in the shroud, A is the area of the opening (m²) and P is the length of the perimeter of the opening (m). These parameters are particularly useful for determining the structural and operating parameters of an apparatus to be employed herein at an impeller blade tip velocity of at least about 500 in/sec (at least about 12.5 m/s).

By employing the unique combination of impeller blade tip velocity and gas velocity index through the shroud openings as set forth herein, and/or the unique combination of ESI and SEI values as recited above, a very efficient distribution of gas and liquid phases is effected, such that rapid and efficient mass transfer occurs. As noted above and as described in detail below, this result may be employed in a variety of applications where such rapid and efficient mass transfer, agitation of the liquid phase and gas and liquid mixing is desirable and can be effected in the region of the shroud, as opposed to the body of the liquid medium, as in the case of mineral separation.

Such procedures include:

(a) the removal of gaseous components from gas streams, in particular by chemical conversion of such gaseous components or by physical dissolution of such gaseous components or by adsorption on a solid phase, (b) the removal of dissolved components from a liquid phase, in particular by chemical conversion of the dissolved components by gaseous components of the gas stream or physical desorption of dissolved components, (c) the treatment of suspended components in the liquid phase, in particular by chemical treatment with gaseous components of the gas stream, and (d) removal of particulates and other non-gaseous components from gas streams, including thermal energy.

The enhanced efficiency which is achieved in the present invention results from high shear rates affecting both the gas and liquid phases in the shrouded region, whereby an intimate mixture of gaseous and liquid phases is formed confined within the shroud and passage of the intimate mixture through and in contact with the shroud, such as to achieve rapid mass transfer of interactive components one to the other, along with a powerful pumping action of liquid and liquid-gas mixture provided by the impeller.

Also as discussed in more detail below, the equipment used in the method of the present invention, has a superficial similarity to flotation equipment generally employed for the separation of suspended solid components from a liquid phase. However, the present invention employs equipment modifications and operating parameter modifications not employed in such flotation operations and which contribute to the unique nature of the present invention.

GENERAL DESCRIPTION OF INVENTION

Figure 1:
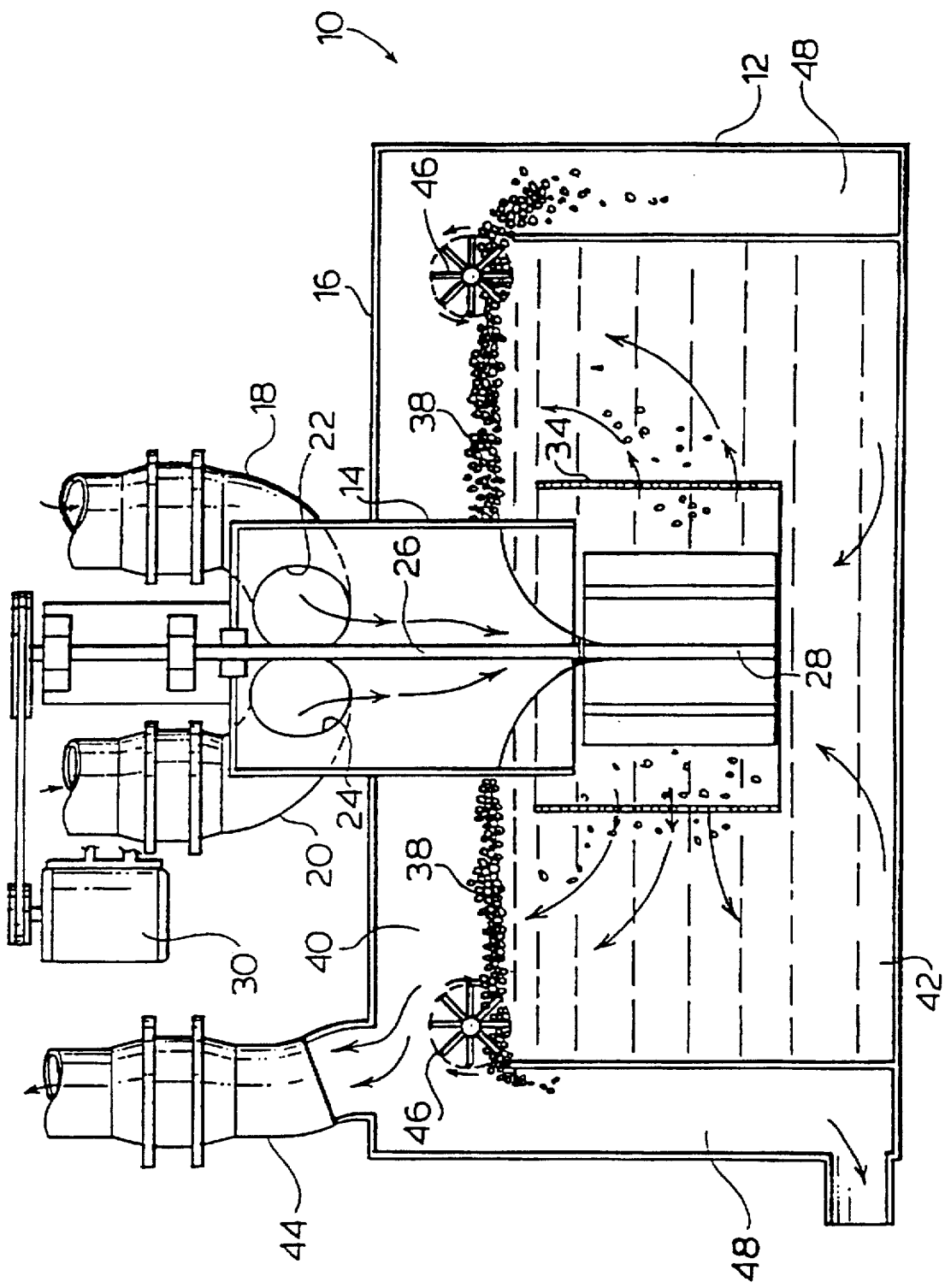
FIG. 1 is an upright sectional view of a novel gas-liquid contact apparatus provided in accordance with one embodiment of the invention.

The present invention is directed, in one embodiment, towards improving the process of the prior Canadian Patent No. 1,212,819 by modification to the physical structure of the agitated flotation cell employed therein and of the operating conditions employed therein, so as to improve the overall efficiency of hydrogen sulfide removal and thereby decrease operating and capital costs, while, at the same time, retaining a high efficiency for removal of hydrogen sulfide from the gas stream.

However, the present invention is not restricted to effecting the removal of hydrogen sulfide from gas streams by oxidation, but rather the present invention is generally applicable to the removal of gas, liquid and/or solid components from a gas stream by chemical reaction and/or physical process, and more broadly includes the removal of gaseous phase components in any physical form as well as sensible heat from a gas stream by gas-liquid contact, and the removal of components from a liquid phase, in particular for the chemical conversion of components from a liquid phase while in contact with the gaseous phase.

In one embodiment of the present invention, a gas stream is brought into contact with a liquid phase in such a manner that there is efficient contact of the gas stream with the liquid phase for the purpose of removing components from the gas stream, particularly an efficient contact of gas and liquid is carried out for the purpose of effecting a reaction which removes a component of the gas and converts that component to an insoluble phase while in contact with the liquid phase. However, the removal of a component may be effected by a physical separation technique, rather than a chemical reaction. These operations contrast markedly with the conventional objective of the design of a flotation cell, which is to separate a slurry or suspension into a concentrate and a gangue or barren stream in minerals beneficiation. A component is not specifically removed from a gas stream during the latter operations, nor is there an interaction of gaseous phase and liquid phase components. The distribution of the gas phase in the liquid phase in such flotation processes is generally for the sole purpose of physical removal of the solid phase by flotation by gaseous bubbles.

There are a variety of processes to which the principles of the present invention can be applied. The processes may involve reaction of a gaseous component of the gas stream with another gaseous species in a liquid phase, usually an aqueous phase, often an aqueous catalyst system.

One example of such a process is the oxidative removal of hydrogen sulfide from gas streams in contact with an aqueous transition metal chelate system to form sulfur particles, as described generally in the above-mentioned Canadian Patent No. 1,212,819.

Another example of such a process is in the oxidative removal of mercaptans from gas streams in contact with a suitable chemical reaction system to form immiscible liquid disulfides, potentially in combination with hydrogen sulfide removal.

A further example of such a process is the oxidative removal of hydrogen sulfide from gas streams using chlorine in contact with an aqueous sodium hydroxide solution, to form sodium sulphate, which, after first saturating the solution, precipitates from the aqueous phase.

An additional example of such a process is the removal of sulfur dioxide from gas streams by the so-called "Wackenroder's" reaction by contacting hydrogen sulfide with an aqueous phase in which the sulfur dioxide is initially absorbed, to form sulfur particles. This process is described in U.S. Pat. Nos. 3,911,093 and 4,442,083. The procedure of the present invention also may be employed to effect the removal of sulfur dioxide from a gas stream into an absorbing medium in an additional gas-liquid contact vessel.

A further example of such a process is the removal of sulfur dioxide from gas streams by reaction with an aqueous alkaline material.

The term "insoluble phase" as used herein, therefore, encompasses a solid insoluble phase, an immiscible liquid phase and a component which becomes insoluble when reaching its solubility limit in the liquid medium after start up.

The component removed from the gas stream in this embodiment of the invention usually is a gaseous component but the present invention includes the removal of other components from the gas stream, such as particulate material or dispersed liquid droplets.

For example, the present invention may be employed to remove solid particles, such as sulfur dust, or liquid droplets from a gas stream, for example, aerosol droplets, such as sulfuric acid mist, such as by scrubbing with a suitable liquid medium. Any component lacking an affinity for the liquid phase removed from a gas stream in such a procedure may be removed therefrom, such as by flotation, while any component having an affinity for the liquid phase removed from a gas stream in this way may-remain therein. A foam formed on the surface of the liquid phase may trap floated particulate matter and/or residual aerosol material. Similarly, moisture may be removed from a gas stream, such as by scrubbing with a suitable hydrophilic organic liquid, such as glycol.

A wide range of particle sizes from near molecular size through Aitken nuclei to visible may be removed from a gas stream by the well understood mechanisms of diffusion, interception, impaction and capture in a foam layer using the method described herein.

More than one component of any type and components of two or more types may be removed simultaneously or sequentially from the gas stream. In addition, a single component may be removed in two or more sequential operations.

The present invention also may be employed to remove sensible heat (or thermal energy) from a gas stream by contacting the gas stream with a suitable liquid phase of lower temperature to effect heat exchange. Similarly, sensible heat may be removed by evaporation of a liquid phase. In addition, a hot liquid medium may be contacted by a cool gaseous medium.

Accordingly, in one preferred aspect of the present invention, there is provided a method of removing a component from a gas stream containing the same in a liquid phase, comprising a plurality of steps. A component-containing gas stream is fed to a gas-liquid contact zone in which is located a liquid medium, and which may be enclosed.

An impeller comprising a plurality of blades is rotated about a generally vertical axis at a submerged location in the liquid medium, while the gas stream is flowed along a generally vertical flow path from external to the gas-liquid contact zone to the submerged location.

The impeller is surrounded by a shroud through which are formed a plurality of openings, generally within a preferred range of impeller to shroud diameter ratios as determined by the ESI index as discussed above. The impeller is rotated at a speed corresponding to a blade tip velocity of at least about 350 in/sec. (9 m/s), preferably at least about 500 (12.5 m/s), for example, up to or greater than about 700 in/sec. (18 m/s), so as to generate sufficient shear forces between the impeller blades and the plurality of openings in the shroud to distribute the gas stream as gas bubbles in the liquid medium to the interior of the shroud, thereby achieving intimate contact of the component and liquid medium at the submerged location so as to form a gas-liquid mixture of gas bubbles in the liquid medium contained within the shroud while effecting shearing of the gas-liquid mixture within the shroud and to effect removal of the component from the gas stream into the liquid medium. The impeller may be constructed and rotated in such a manner as to provide an SEI value, as defined above, of about 1 to about 10, preferably about 4 to about 5.

The gas-liquid mixture from within the interior of the shroud through and in contact with the openings therein into the body of the liquid medium external to the shroud at a gas velocity index (GVI) at least about 18 per second per opening, preferably at least about 24 per second per opening, so as to effect further shearing of the gas-liquid mixture and further intimate contact of the gas stream and the liquid medium, whereby any removal of component not effected in the interior of the shroud is completed in the region of the liquid medium adjacent to The exterior of the shroud.

In this embodiment, as well as the other embodiments of the invention, the gas velocity index (GVI) more, preferably is at least about 30 per second per opening, and may range to very high values, such as up to about 500 per second per opening, and often is in excess of about 100 per second per opening. The impeller and shroud arrangement may provide an ESI value, as defined above, of about 1 to about 2500, preferably about 10 to about 250.

As mentioned above, the gas velocity index (GVI) is determined by the expression:

$$GVI = \frac{QP}{4nA^2}$$

where Q is the volumetric flow rate of gas (m$^3$/s), n is the number of openings in the shroud, A is the area of the opening (m$^2$) and P is the length of the perimeter of the opening (m).

A component-depleted gas stream is vented from a gas atmosphere above the liquid level in the gas-liquid contact zone.

While the gas-liquid contact procedure is generally operated with an enclosed reaction zone operating at or near atmospheric pressure, it also is possible to carry out the gas stream component removal method under superatmospheric and subatmospheric conditions, depending on circumstances and requirements.

While the present invention, in the gas stream component removal embodiment, is described specifically with respect to the removal of hydrogen sulfide and sulfur dioxide from gas streams containing the same by reaction to form sulfur and recovery of the so-formed sulfur by flotation by bubbles of the component-depleted gas stream, it will be apparent from the foregoing and subsequent discussion that both the apparatus provided in accordance with an aspect of the present invention and the gas stream component removal method embodiment of the invention are useful for effecting other procedures where a component of a gas stream is removed in a liquid medium or a component of a liquid medium is removed or treated by contact with a gaseous component. In addition, it will be apparent that the present invention broadly relates to method and apparatus for contacting a gas phase with a liquid phase for a variety of purposes.

In one preferred aspect of the invention, hydrogen sulfide contained in a gas stream is converted to solid sulfur particles by oxygen in an aqueous transition metal chelate solution as a reaction medium. The oxygen employed in this conversion process is present in an oxygen-containing gas stream which is introduced to the same submerged location in the aqueous catalyst solution as the hydrogen sulfide-containing gas stream, either in admixture therewith or as a separate gas stream. The oxygen-containing gas stream similarly is sheared by the rotating impeller-shroud combination, which achieves intimate contact of oxygen and hydrogen sulfide with each other and the aqueous catalyst solution to effect the oxidation. The hydrogen sulfide is removed by chemical conversion to insoluble sulfur particles.

The solid sulfur particles may be permitted to grow or are subjected to spherical agglomeration or flocculation until they are of a size which enables them to be floated from the body of the reaction medium to the surface thereof by hydrogen sulfide-depleted gas bubbles.

The sulfur is generally of crystalline form and particles of sulfur are transported by the hydrogen-sulfide depleted gas bubbles from the reaction medium to the surface thereof when having a particle size of from about 10 to about 50 microns in diameter to form a sulfur froth floating on the surface of the aqueous medium and a hydrogen sulfide-depleted gas atmosphere above the froth, from which is vented a hydrogen sulfide-depleted gas stream. The sulfur-bearing froth may be removed from the surface of the aqueous medium to exterior of the enclosed reaction zone, either on a continuous or intermittent basis.

Sulfur formed in such hydrogen sulfide-removing processes has been found to be highly adsorbent of other odiferous components, such as odiferous sulfurous and/or nitrogenous compounds, and hence which are removed on sulfur formed during the hydrogen sulfide oxidation. This result makes the process particularly useful in the treatment of exhaust gas streams from meat rendering plants, pulp mills and gas process plants which contain a large variety of odiferous sulfur and nitrogen compounds, in addition to hydrogen sulfide, which are adsorbed by the sulfur and hence are removed from the gas stream, thereby permitting an odour-reduced gas stream to be vented from the plant. The use of freshly precipitated high surface area sulfur for the removal of odiferous gases from gas streams is an additional aspect of the present invention.

Accordingly, in an additional aspect of the present invention, there is provided a continuous method for the removal of components from a gas stream comprising a component oxidizable to sulfur in a liquid catalyst-containing medium and odiferous components, which comprises continuously forming sulfur in a liquid phase from the component oxidizable to sulfur continuously adsorbing odiferous components from the gas stream on the continuously-formed sulfur, and continuously removing sulfur from the liquid phase.

Since sulfur is formed continuously from the hydrogen sulfide or other sulfur-forming component and floated from the liquid phase, the sulfur particles in the froth on the surface of the liquid are continuously removed, so that the odiferous compounds are continuously removed from the gas phase.

High levels of hydrogen sulfide removal efficiency may be attained using the method of the present invention, if desired, in excess of 99.99%, from gas streams containing any concentration of hydrogen sulfide. Residual concentrations of hydrogen sulfide less than 0.1 ppm by volume can be attained, if desired. Corresponding removal efficiencies are achieved for the removal of other gaseous components from gas streams.

The method of the invention is able to remove effectively hydrogen sulfide from a variety of different source gas streams containing the same, provided there is sufficient oxygen present and dispersed in the reaction medium to oxidize the hydrogen sulfide. The oxygen may be present in the hydrogen sulfide-containing gas stream to be treated or may be separately fed, as is desirable where natural gas or other combustible gas streams are treated.

Hydrogen sulfide containing gas streams which may be processed in accordance with the invention include fuel gas, anaerobic digester gas, and natural gas and other hydrogen sulfide-containing streams, such as those formed in oil processing, oil refineries, mineral wool plants, kraft pulp mills, rayon manufacturing, heavy oil and tar sands processing, coal coking, meat rendering, a foul gas stream produced in the manufacture of carborundum and gas streams formed by air stripping hydrogen sulfide from aqueous phases. The gas stream may be one containing solids particulates or may be one from which particulates are absent. The ability to handle a particulate-laden gas stream in the present invention without plugging may be beneficial, since the necessity for upstream cleaning of the gas is obviated.

The method of the present invention as it is applied to effecting removal of hydrogen sulfide from a gas stream containing the same generally employs a transition metal chelate in aqueous medium as the catalyst for the oxidation of hydrogen sulfide to sulfur. The transition metal usually is iron, although other transition metals, such as vanadium, chromium, manganese, nickel and cobalt may be employed, provided that such metals have multiple valence states and possess the required oxidation potential. Any desired chelating agent may be used provided that it possesses the appropriate complex formation constant, but generally, the chelating agent is ethylenediaminetetraacetic acid (EDTA). An alternative chelating agent is HEDTA. The transition metal chelate catalyst may be employed in hydrogen or salt form. The operative range of pH for the process generally is about 7 to about 11. The transition metal chelate may be added as such or may be formed in situ.

At elevated temperatures of operation, the complex iron chelate catalyst tends to break down and form a suspension of iron hydroxide in the aqueous medium. Surprisingly, the conversion of hydrogen sulfide to sulfur remains effective in the presence of such precipitated iron hydroxide. This result is particularly surprising since prior attempts have been made to use iron hydroxide with only a limited degree of success, as a result of formation of ferrous sulfide due to the absence of mass transfer rates of oxygen sufficient to oxidize the ferrous sulfide. The iron hydroxide particles are very finely divided and well dispersed in the aqueous phase and are maintained in suspension by the circulation of liquid in the reaction medium provided by the impeller. In place of iron hydroxide as the catalytic component, there may be employed another transition metal hydroxide.

One effect of the utilization of such finely divided ferric hydroxide for the oxidative conversion of hydrogen sulfide to sulfur is that the sulfur is obtained in a very finely-divided, free-flowing form, and can be quite different from the physical form of the sulfur obtained using iron chelate.

The microcrystalline sulfur which is obtained is free-flowing and has a particle size distribution of less than about 10 microns and an average particle size of about 1 micron or less and is a useful commercial commodity, as a pesticide or fungicide. The microcrystalline sulfur, which forms one embodiment of the invention, generally has free iron hydroxide adsorbed thereon from the catalyst in the reaction medium, which is beneficial in some uses of the sulfur.

The iron hydroxide used in the catalytic conversion of hydrogen sulfide to sulfur is provided preferably as freshly precipitated material formed from iron chelate solution or other convenient source, such as reaction of an iron salt, such as ferric chloride or ferric sulfate, with sodium hydroxide, since the iron hydroxide is thereby provided a very finely divided form. However, iron hydroxide from commercial sources also may be employed. Where the sulfur produced is contaminated by iron hydroxide, the sulfur may be treated with a solution of EDTA or other complexing agent, or with acid to remove the iron contaminant, and then washed and dried.

The hydrogen sulfide removal process of the invention is conveniently carried out at ambient temperatures of about 20° to 35° C., although higher and lower temperatures may be adopted and still achieve efficient operation. The temperature generally ranges from about 5 to about 80° C., although higher temperature may be employed.

The minimum catalyst concentration to hydrogen sulfide concentration ratio for a given gas throughput may be determined from the rates of the various reactions and of mass transfer occurring in the process and is influenced by the temperature and the degree of agitation or turbulence in the reaction vessel. This minimum value may be determined for a given set of operating conditions by decreasing the catalyst concentration until the removal efficiency with respect to hydrogen sulfide begins to drop sharply. Any concentration of catalyst above this minimum may be used, up to the catalyst loading limit of the system.

The removal of hydrogen sulfide by the process of the present invention is carried out in an enclosed gas-liquid contact zone in which is located an aqueous medium containing transition metal chelate catalyst. A hydrogen sulfide-containing gas stream and an oxygen-containing gas stream, which usually is air but may be pure oxygen or oxygen-enriched air, may be caused to flow, either separately or as a mixture, along a vertical flow path from outside the gas-liquid contact zone to a submerged location in the aqueous catalyst medium, or otherwise introduced to the submerged location, from which the mixture is forced by the rotating impeller to flow through the shroud openings into the body of the aqueous medium. The rotating impeller also draws the liquid phase from the body of aqueous medium in the enclosed zone to the location of introduction of the gas streams, interior of the shroud.

As described above, the gas streams are distributed as bubbles by the combined action of the rotating impeller and the surrounding shroud which has a plurality of openings therethrough. To achieve good gas-liquid contact and hence efficient oxidation of hydrogen sulfide to sulfur, the impeller is rotated rapidly so as to achieve a blade tip velocity of at least about 350 in/sec. (9 m/s), preferably at least about 500 (12.5 m/s), for example, up to and above about 700 in/sec. (18 m/s). In addition, shear forces between the impeller and the stationary shroud assist in achieving the good gas-liquid contact by providing a gas velocity index (as defined above) which is at least about 18 per second per opening, preferably at least about 24 per second per opening. In this aspect of the invention and the others described herein, other than at or near the upper limit of capacity of a unit, the gas flow rate through the openings, measured at atmospheric pressure, is less than about 0.02 lb/min/opening in the shroud, generally down to about 0.004, and preferably in the range of about 0.005 to about 0.007 lb/min/opening in the shroud. In addition, the procedure may be operated at an ESI value of about 1 to about 2500, preferably about 10 to about 250, optimally at about 50, and an SEI value of about 1 to about 10, preferably about 4 to about 5.

The high shear rate of the gas-liquid mixture provided by the impeller-shroud combination used herein enables a high rate of mass transfer to occur. In the catalyst solution, a complicated series of chemical reactions occurs resulting in an overall reaction which is represented by the equation:

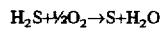

The overall reaction thus is oxidation of hydrogen sulfide to sulfur.

As noted earlier, the solid sulfur particles may be allowed to grow in size until of a size which can be floated.

Alternative procedures of increasing the particle size may be employed, including spherical agglomeration or flocculation. The flotable sulfur particles are floated by the hydrogen sulfide-depleted gas bubbles rising through the body of catalyst solution and collected as a froth on the surface of the aqueous medium. The sulfur particles range in size from about 10 to about 50 microns in diameter and are generally in crystalline form.

The series of reactions which is considered to occur in the metal chelate solution to achieve the overall reaction noted above is as follows:

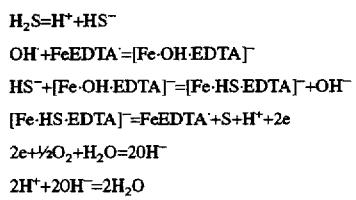

Alternatively, the oxygen-containing gas stream may be introduced to the metal chelate solution at a different submerged location from the hydrogen sulfide-containing gas stream using a second impeller/shroud combination, as described in more detail in U.S. Pat. No. 5,403,567, assigned to the assignee hereof, the disclosure of which is incorporated herein by reference.

In another preferred aspect of the present invention, sulfur dioxide is reacted with an alkaline medium to remove the sulfur dioxide from a gas stream bearing the same. Sulfur dioxide is absorbed from the gas stream into the aqueous alkaline medium and reacts with active alkali therein to form salts, with the sulfur dioxide-depleted gas stream being vented from the reaction medium. The procedure shows many similarities with the hydrogen sulfide-removal procedure just described, except that the aqueous medium contains a non-catalytic alkaline material.

The aqueous alkaline medium into which the sulfur dioxide-containing gas stream is introduced may be provided by any convenient alkaline material in aqueous dissolution or suspension. One convenient alkaline material which can be used is an alkali metal hydroxide, usually sodium hydroxide. Another convenient material is an alkaline earth metal hydroxide or carbonate, usually a lime slurry or a limestone slurry.

Absorption of sulfur dioxide in an aqueous alkaline medium tends to produce the corresponding sulfite. It is preferred, however, that the reaction product be the corresponding sulfate, in view of the greater economic attraction of the sulfate salts. For example, where lime or limestone slurry is used, the by-product is calcium sulfate (gypsum), a multi-use chemical.

Accordingly, in a preferred aspect of the invention, an oxygen-containing gas stream, which usually is air but which may be pure oxygen, oxygen-enriched air or ozone, analogously to the case of hydrogen sulfide, also is introduced to the aqueous alkaline reaction medium, so as to cause the sulfate salt to be formed. When such oxidation reaction is effected in the presence of a lime or limestone slurry, it is generally preferred to add a small amount of an anti-caking agent, to prevent caking of the by-product calcium sulfate on the lime or limestone particles, decreasing their effectiveness. One suitable anti-caking agent is magnesium sulfate.

The concentration of sulfate salt builds up in the aqueous solution after initial start up until it saturates the solution, whereupon the sulfate commences to precipitate from the solution.

The oxygen-containing gas stream, when used, may be introduced to the aqueous medium at the same submerged location as the sulfur dioxide-containing gas stream, either in admixture with the sulfur dioxide-containing gas stream or as a separate gas stream.

Alternatively, the oxygen-containing gas stream may be introduced to the aqueous alkaline medium at a different submerged location from the sulfur dioxide-containing gas stream using a second impeller/shroud combination, as described in more detail in the aforementioned copending U.S. Pat. No. 5,403,567.

The process of the invention is capable of rapidly and efficiently removing sulfur dioxide from gas streams containing the same. Such gas streams may contain any concentration of sulfur dioxide and the process is capable of removing such sulfur dioxide in efficiencies exceeding 99.99%. Residual sulfur dioxide concentrations below 0.1 ppm by volume can be achieved.

This sulfur dioxide removal embodiment of the invention can be carried out under a variety of process conditions, the choice of conditions depending, to some extent, on the chemical imparting alkalinity to the reaction medium. For an alkali metal hydroxide, the aqueous alkaline solution generally has a concentration of from about 50 to about 500 g/L. For an alkaline earth metal hydroxide or carbonate, the aqueous alkaline solution generally has a concentration of from about 1 to about 20 wt %. The active alkalinating agent may be continuously and intermittently replenished to make up for the conversion to the corresponding sulfite or sulfate. The reaction temperature may vary widely from about 5° to about 100° C. or higher, if a superatmospheric pressure is applied to the liquid phase.

One specific use to which the present invention may be put is in the desulfurization of gas streams containing sulfur dioxide and hydrogen sulfide by reacting the gases together by the Claus reaction in a liquid environment. One such application of such procedures is in the treatment of tail gas from a Claus reactor used in the natural gas refining industry.

In a Claus reactor, hydrogen sulfide and sulfur dioxide react together at high temperature greater than about 600° C. over a fixed catalytic bed, usually of bauxite. The sulfur dioxide for such reaction usually is formed by oxidation of a portion of the hydrogen sulfide contained in a feed stream. The process is over 95% efficient in removing the hydrogen sulfide and producing liquid sulfur. The tail gas from such operation, however, contains low concentrations of $H_2S$ and $SO_2$ which yet are sufficiently high as to preclude environmental discharge and a tail gas clean-up unit often is required.

The tail gas stream is processed in one embodiment of the present invention to remove substantially all hydrogen sulfide and sulfur dioxide from the gas stream, to-enable the purified gas stream to be discharged to the environment. The procedure involves a two-step operation, in which substantially all the sulfur dioxide first is removed by reaction with hydrogen sulfide in the tail gas stream in a liquid medium, which may be an aqueous medium, in a first reaction vessel by using the impeller and shroud combination provided herein to distribute the gases in the liquid phase. The combination of impeller and shroud provides a highly efficient contact of the gases with each other and the liquid phase, to cause reaction of sulfur dioxide and hydrogen sulfide to sulfur. The liquid phase may contain a suitable catalyst material for the reaction, as described in U.S. Pat. No. 4,442,083.

The concentration of sulfur dioxide, which preferably is less than stoichiometric, is rapidly and effectively removed from the tail gas stream by this procedure, along with a proportion of hydrogen sulfide reacting with the sulfur dioxide. By-product sulfur from this reaction may be floated or otherwise removed from the liquid phase, as described in more detail elsewhere herein.

The rate of conversion of sulfur dioxide and hydrogen sulfide to sulfur in a liquid phase may be and generally is dependent on the rate of absorption of hydrogen sulfide and sulfur dioxide. The impeller shroud combination employed herein providing a high degree of shearing of the gases and agitation of the liquid and gaseous phases effects mass transfer of the gases in a very effective manner. Once distributed into the liquid phase, the gases form species which can interact and react to form sulfur.

The various reactions involved in an aqueous system may be depicted as follows:

(a) Absorption:

$$2H_2S(g) \rightarrow 2H_2S(aq)$$

$$SO_2(g) \rightarrow SO_2(aq)$$

(b) Ionization:

$$2H_2S(aq) \rightarrow 2HS^- + 2H^+$$

$$SO_2(aq) + H_2O \rightarrow HSO_3^- + H^+$$

(c) Oxidation/Reduction:

$$HSO_3^- + 4e^- + 5H^+ \rightarrow S + 3H_2O$$

$$2HS^- \rightarrow 2S + 2H^+ + 4e$$

(d) Overall:

$$2H_2S + SO_2 \rightarrow 3S + 2H_2O$$

The ionization step is facilitated by the employment of an aqueous phase. The solubility of HS increases rapidly with increasing pH to a maximum level at about pH 8 while the solubility of $HSO_3^-$ increases rapidly to a maximum level at about pH 2 and declines rapidly beyond a pH of about 7. The maximum concentrations of $HS^-$ and $HSO_3^-$ occur at about pH 6.5. However, prior studies have suggested that a pH in the range of about 3 to about 5.5 are most effective for producing sulfur. A range of pH of about 1.5 to about 8.5 may be employed. A phosphate buffer, such as a mixture of phosphoric acid and potassium dihydrogen phosphate, may be added to maintain a constant pH during the reaction, as suggested in U.S. Pat. No. 3,911,093, and to promote the ionization reactions. Other liquid media, such as tricresyl phosphate and liquid sulfur may be used to effect such processes.

While room temperature and atmospheric pressure conditions may be employed effectively for the liquid phase reaction, it is possible to use a wide range of temperature for the reaction, for example, from about 5° C. to about 80° C., and higher, for an aqueous system.

The sulfur dioxide-depleted tail gas stream containing residual amounts of hydrogen sulfide then may be forwarded to a second reaction vessel also containing an impeller-shroud combination as described herein, along with an aqueous catalytic medium in which the hydrogen sulfide is oxidized to sulfur, as described above. Any mercaptans and other organic sulfides hat may be present are adsorbed on the sulfur as described previously. The clean gas stream is vented from the second reactor. The removal of sulfur dioxides and the organic sulfides in this manner avoids the necessity to employ a hydrotreater, an expensive piece of equipment.

The latter procedure may be employed on gas streams comprising hydrogen sulfide, wherein a portion of the hydrogen sulfide is initially oxidized to sulfur dioxide, and the resulting stream then is subjected to the liquid Claus reaction to remove substantially the sulfur dioxide and then subject the residual stream to a hydrogen sulfide removal process.

Such a two-step treatment process is a novel procedure applicable to the removal of hydrogen sulfide from gas streams independent of the specific means of gas-liquid contacting employed in each of the process steps for an overall net cost saving in chemicals. Accordingly, in a further aspect of the present invention, there is provided a process for the removal of hydrogen sulfide from a gas stream containing the same, which comprises oxidizing a portion of the hydrogen sulfide therein to form sulfur dioxide therefrom and to produce an oxidized gas stream containing a stoichiometric excess of hydrogen sulfide; reacting substantially all the sulfur dioxide in the oxidized gas stream with hydrogen sulfide remaining in the oxidized gas stream in a liquid phase to form sulfurous material therefrom contained in the liquid phase and to produce a further gas stream having a decreased hydrogen sulfide content; oxidizing substantially all hydrogen sulfide remaining in the further gas stream in a liquid phase to form a sulfurous material therefrom; and venting a gas stream substantially free from gaseous sulfur compounds. By adopting such a procedure, the quantity of chelating agent required to effect hydrogen sulfide oxidation is significantly decreased, compared to a procedure in which the initial gas stream is directly treated by an aqueous catalyst system.

Another application of the process of the invention is the carbonating of lime suspension to produce precipitated calcium carbonate, by utilizing the impeller-shroud combination to introduce carbon dioxide into a suspension of lime in a reactor. The lime is maintained in suspension by the agitation and circulation produced by the impeller-shroud combination. Finely-divided calcium carbonate (whiting) is produced by this procedure and is a high value-added product, having utility in the paper coating and plastics industries, among others.

The process of the present invention further may be employed to effect selective removal of sulfur dioxide from gas streams containing the same, for example, a carbon dioxide-containing gas stream intended for use in the carbonating of lime as described above and contaminated with sulfur dioxide. For many applications, finely-divided calcium carbonate is required having less than 0.2 wt % of any insoluble component. For initial removal of sulfur dioxide, a slurry of pulverized calcium carbonate may be employed, as described elsewhere herein.

Such pulverized calcium carbonate or limestone also may be employed in the process of the invention to effect pH maintenance in systems scrubbing acid gases, such as hydrogen sulfide, sulfur dioxide or mixtures thereof. For example, with a mixture of hydrogen sulfide and sulfur dioxide, hydrogen sulfide may be removed by oxidation to sulfur, such as in an iron chelate catalyst solution, as described elsewhere herein, while the sulfur dioxide is scrubbed from the gas stream by the calcium carbonate.

Elemental sulfur produced by such procedure may be preferentially separated from the produced calcium carbonate suspension by flotation. However, the limestone slurry, which eventually becomes depleted as calcium sulfate, or gypsum plus sulfur, may be added to incineration ash, or used in agriculture as a calcium-sulfur supplement, for example, as a soil conditioner, or may be disposed of as land-fill.

In addition to the removal of gaseous components from a gas stream as particularly described above, the procedure of the present invention, employing the impeller-shroud combination, and the operating parameters of impeller tip speed velocity and gas velocity index through the shroud, and/or ESI and SEI values, also may be used in other instances where distribution of gas phase in a liquid phase is desired and intimate contact of gaseous and liquid phases is desired.

For example, the procedure of the invention may be employed in waste water treatment, where undesired dissolved components in the liquid phase, including both BOD and COD, are removed by oxidation by oxygen, ozone or chlorine dioxide contained in a gas stream and subjected to high shear in the manner described above. Alternatively, hydrogen sulfide may be removed from liquid media, for example, hydrogen sulfide may be stripped from sour water or may be stripped from liquid sulfur, as described in more detail below.

An application of the process of the invention in the pulp and paper industry is the oxidation and/or stripping of components of white, green or black liquor. White liquor is a solution of sodium sulfide and sodium hydroxide used to form wood pulp from wood chips. Oxidation of such material may be achieved by dispersing an oxidizing gas stream in the pulp liquor using the procedures described herein.

The dispersion of gaseous phase in the liquid phase in the present invention may be combined with other components to effect the desired reaction or interaction between gaseous and liquid phase components. As described above, such additional components may comprise a catalyst dissolved in the liquid phase promoting reaction between gaseous components.

Another example is the removal of the volatile organic compounds (VOC's), as well as semi-volatile organic compounds, from aqueous streams using a gas subjected to high shear rates in an impeller and shroud combination and the process conditions described herein.

In this procedure, a multi-stage unit may be employed consisting of three or four independent impeller systems, together with a feed of oxygen or other oxygen-containing gas, such as air, possibly under pressure. The water to be treated to remove VOCs then may be introduced at one end of the series of contactors and removed, after treatment, at the other end. In each contacting stage, the VOCs are stripped from the aqueous phase. Concentrated VOCs then may be passed in contact with a catalyst for oxidation of VOCs, for example, by oxygen or ozone to carbon dioxide and similar oxidation products external to the stripping operation. Alternatively, the VOCs may be recovered.

If desired, liquid circulation within the contactor can be controlled by a series of overflow-underflow. weirs, ensuring good gas-liquid contact and a reasonable residence time of liquid within each contact cell. The liquid flow rate can be modified over a wide range depending on the contaminant level and activity.

In some instances of utilization of the procedure described herein, it is desirable to operate with the interior of the gas-liquid contactor under pressure, for example, where temperatures over 100° C. are used with aqueous systems.

A problem arises, however, in ensuring an adequate seal between a rotating drive shaft for the impeller passing through an upper closure to the gas-liquid contactor to a device motor. This difficulty may be overcome by employing a hydraulically- or pneumatically-driven motor located in the interior of the gas-liquid contact vessel with tubes carrying fluid passing through static seals from the exterior of the gas liquid contact vessel to the motor. Such static seals are much easier to maintain than the dynamic seals required for drive shafts.

In addition, the use of a hydraulically- or pneumatically-driven motor in place of an electrically-driven motor provides a safety factor for a drive motor located within the enclosure, particularly if combustible gases are present which might be ignited by an electric spark.

Another application of the impeller-shroud combination provided herein involves the processing of viscous liquids, such as liquid sulfur and asphalt. Such processing may involve simple circulation of the viscous liquid in a vessel, stripping of absorbed gases from the viscous liquid and/or transfer of gaseous components into the viscous liquid. The parameters of operation and the physical structure of the shroud-impeller combination used in those latter procedures may be but not necessarily be different from those employed with aqueous and other low viscosity media as described elsewhere herein.

Accordingly, an additional aspect of the present invention provides a method for the processing of a viscous liquid, which comprises immersing a rotary impeller comprising a plurality of blades in a mass of the viscous liquid surrounded by a shroud through which are formed a plurality of openings, and rotating the impeller about a substantially vertical axis at a speed sufficient to draw liquid phase from the mass and to flow the liquid phase through the openings in the shroud to cause circulation-of the mass of viscous liquid, along with a desorbing of an absorbed component from the viscous liquid, and/or transfer of a gaseous component to the viscous liquid.

Liquid sulfur is a by-product from the removal of hydrogen sulfide from oil refining or sour gaseous streams by the Claus process, wherein hydrogen sulfide is reacted with sulfur dioxide. Hydrogen sulfide is soluble to a limited degree in the liquid sulfur and small quantities of unconverted hydrogen sulfide, usually about 50 to 300 ppmw, become dissolved in the liquid sulfur during the course of the Claus process. Such dissolved hydrogen sulfide is reactive with the sulfur and tends to produce and reach an equilibrium with hydrogen polysulfides.

Hydrogen sulfide concentrations tend to build up in the head space of tank cars used to ship the liquid sulfur, as a result of slow diffusion of the hydrogen sulfide produced from the decomposition of hydrogen polysulfides contained in the liquid sulfur, often to lethal or explosive levels. During processing of the liquid sulfur, a large fraction of the hydrogen sulfide is stripped, creating handling problems. Some hydrogen sulfide as well as hydrogen polysulfides remain entrapped in the solid sulfur product. The hydrogen polysulfides tend to break down over time to sulfur and hydrogen sulfide. As a result, the odour of hydrogen sulfide can be detected at storage sites, during transportation and even several weeks after a customer has received the product, as the hydrogen sulfide slowly diffuses out of the solid sulfur.

Several proposals have been made to degas liquid sulfur to removed dissolved hydrogen sulfide, but these processes are either costly and/or ineffective.

In accordance with the present invention, a shrouded-impeller may be employed to effect circulation of liquid sulfur to assist in degassification of the liquid sulfur by convection as a result of agitation of the liquid sulfur by the impeller and shroud, with the hydrogen sulfide-containing product gas stream being further processed, such as described above by oxidative conversion to sulfur in an aqueous catalyst system.

In addition, the shroud-impeller may be employed to introduce an oxidizing gas, for example, air or oxygen, to the liquid sulfur, to effect a combination of operations to remove hydrogen sulfide and hydrogen polysulfides, by stripping of hydrogen sulfide, oxidation of hydrogen sulfide to sulfur and oxidation of hydrogen polysulfides to sulfur with or without the use of reagents, as a result of the high levels of mass transfer of an oxidizing gas, such as oxygen or sulfur dioxide, and agitation achieved using the shroud-impeller combination. Preferably, the liquid sulfur is saturated with oxygen or other oxidizing gas by such distribution to ensure complete removal of hydrogen sulfide and hydrogen polysulfides from the liquid sulfur. By removing hydrogen sulfide and hydrogen polysulfides from the liquid sulfur in this way, the prior art handling problems with respect to liquid sulfur and solidified sulfur produced therefrom are overcome.

As noted above, another viscous liquid which may be processed using an impeller-shroud combination is liquid asphalt. Concern has been expressed that some of the volatile compounds which are released from asphalt may be harmful to human health, particularily during paving activities when large surface areas are exposed to the atmosphere. In addition, it is become more common to modify the properties of asphalt by the addition of polymeric materials such as plastomers and elastomers, including materials derived from automotive tires. On occasion, in such processes, sulfur may be added to the asphalt to increase crosslinking, and hydrogen sulfide may be released to the atmosphere.

The addition of oxygen to asphalt tends to create a product which is harder or increased in viscosity, but also tends to diminish the asphalts anti-aging properties, and hence this practice has generally been restricted to asphalt used in the production of roofing materials.

Oxidation of the liquid asphalt may be avoided by the use of an inert gas, such as nitrogen or carbon dioxide, to strip odiferous and/or volatile components from the asphalt, thereby decreasing the evolution of such components during paving operation and/or to improve its properties. An additional source of inert gas may be the exhaust from a combustion engine which may be used to strip the undesired components from the asphalt.

In addition, asphalt may be treated with an oxidizing gas, such as oxygen, oxygen enriched air or air, to alter the properties of the asphalt, for example, to harden it.

DESCRIPTION OF PREFERRED EMBODIMENT

Referring to the drawings, a novel gas-liquid contact apparatus 10, provided in accordance with one embodiment of the invention, is a modified form of an agitated flotation cell. The design of the gas-liquid contactor 10 is intended to serve the purpose of efficiently contacting gases and liquids, for example, to effect removal of a component of the gas, such as by reaction to produce a flotable insoluble phase, but also applicable to the chemical conversion of aqueous phase components by gaseous phase components dispersed in the liquid phase. This design differs from that of an agitated flotation cell whose objective is to separate a slurry or suspension into a concentrate and a gangue or barren stream. Where such apparatus is intended to be employed for treatment of liquid phase material, appropriate inlet and outlet posts are provided.

The reactor 10, constructed in accordance with one embodiment of the invention and useful in chemical and physical processes for removing a component from a gas stream, such as oxidative removal of hydrogen sulfide, and other gas-liquid contacting processes, such as described above, comprises an enclosed housing 12 having a standpipe 14 extending from exterior to the upper wall 16 of the housing 12 downwardly into the housing 12. The housing 12 may be of any convenient shape, generally circular. The housing 12 may be designed such as to avoid dead zones in the liquid phase contained within the housing.

Inlet pipes 18,20 communicate with the standpipe 14 through an inlet manifold at its upper end for feeding gas streams, in this illustrated embodiment, hydrogen sulfide-containing gas stream and oxygen-containing gas stream (air) to reactor 10. The inlet pipes 18,20 have inlet openings 22,24 through which the gas flows. The openings are designed to provide a low pressure drop.

Generally, the flow rate of gas streams may range upwardly from a minimum of about 50 cu.ft/min. (about 25 dm$^3$/s), for example, in excess of about 5000 cu.ft/min. (about 2500 dm$^3$/s), although much higher or lower flow rates may be employed, depending on the intended application of the process. The pressure drop across the unit may be quite low and may vary from about −5 to about +20 in. H$_2$O (from about −250 to about +500 mm H$_2$O), preferably from about 0 to less than about 10 in. H$_2$O (−250 mm H$_2$O). For larger units employing a fan or a blower to assist the gas flow rate to the impeller, the pressure drop may be greater.

A shaft 26 extends into the vessel 10 and has an impeller 28 mounted at its lower end just below the lower extremity of the standpipe 14. A drive motor 30 is mounted to drive the shaft 26. Although there is illustrated in the drawings an apparatus 10 with a single impeller 28, it is possible to provide more than one impeller and hence more than one oxidative reaction (or other chemical or physical process) location in the same enclosed tank. The gas flow rate to the reactor referred to above represents the flow rate per impeller.

The impeller 28 comprises a plurality of radially-extending blades 32. The number of such blades may vary and generally at least four blades are employed, with the individual blades being equi-angularly spaced apart. The impeller is illustrated with the blades 32 extending vertically. However, other orientations of the blades 32 are possible.

Generally, the standpipe 14 has a diameter dimension related to that of the impeller 28 and the ratio of the diameter of the standpipe 14 to that of the impeller 28 generally may vary from about 1:1 to about 2:1. However, the ratio may be lower, if the impeller is mounted below the standpipe. The impeller 28 generally has a height which corresponds to an approximately 1:1 ratio with its diameter, but the ratio generally may vary from about 0.3:1 to about 3:1. As the gas is drawn down through the standpipe 14 by the action of the rotary impeller 28 and the liquid phase is drawn into the impeller, the action of gas and liquid flows and rotary motion produce a vortex of liquid phase in the standpipe and the region of the impeller 28. Alternatively, the gas may be introduced below the impeller and drawn into the interior of the shroud by the action of the impeller.

The ratio of the projected cross-sectional area of the shrouded impeller 28 to the cross-sectional area of the cell may vary widely, and often is less but may be more than in a conventional agitated flotation cell, since the reaction is confined to a small volume of the reaction medium and will be determined by the ultimate use to which the apparatus 10 is put. The ratio may be as little as about 1:2. However, where additional processing of product is required to be effected efficiently, such as flotation of sulfur, the ratio generally will be higher.

Another function of the impeller 28 is to distribute the induced gases as bubbles within the liquid medium in the interior of the shroud. This result is achieved by rotation of the impeller 28, resulting in shear of liquid and gases to form bubbles of relatively wide size distribution dimensioned so that the largest are no more than about ¼ inch (5 mm) in diameter.

A critical parameter in determining an adequate shearing to form the gas bubbles is the velocity of the outer tip of the blades 32. A blade tip velocity of at least about 350 in/sec is required to achieve efficient (i.e., 99.99%+) removal of hydrogen sulfide, preferably at least about 500, and up to and greater than 700 in/sec. This blade tip velocity is much higher than typically used in a conventional agitated flotation cell, wherein the maximum velocity is about 275 in/sec.

The impeller 28 is surrounded by a cylindrical stationary shroud 34 having a uniform array of circular openings 36 through the wall thereof. The shroud 34 generally has a diameter slightly greater than the standpipe 14. Although, in the illustrated embodiment, the shroud 34 is right cylindrical and stationary, it is possible for the shroud 34 to possess other shapes. For example, the shroud 34 may be tapered, with the impeller 28 optionally also being tapered. In addition, the shroud 34 may be rotated, if desired, usually in the opposite direction to the impeller 28. Further, the shroud 34 is shown as a separate element from the standpipe 14. However, the shroud 34 may be provided as an extension of the standpipe, if desired.

Further, the openings 36 in the shroud are illustrated as being circular, since this structure is convenient. However, it is possible for the openings to have different geometrical shapes, such as square, rectangular or hexagonal. Further, all the openings 36 need not be of the same shape or size.

The shroud 34 serves a multiple function in the device. Thus, the shroud 34 prevents gases from by-passing the impeller 28, assists in the formation of the vortex in the liquid necessary for gas induction, assists in achieving shearing as well as providing additional shearing and confines the gas-liquid mixture and hence maintains the turbulence produced by the impeller The effect of the impeller-shroud combination may be enhanced by the employment of a series of elongate baffles, provided on the internal wall of the shroud 34, preferably vertically extending from the lower end to the upper end of the openings in the shroud. The gas-liquid mixture flows through and in contact with the openings 36 in the shroud which results in further shearing of the gas bubbles and further intimate contact of the gaseous and liquid phases.

The shroud 34 is spaced only a short distance from the extremity of the impeller blades 30, in order to provide and promote the above-noted functions. Generally, the ratio of the diameter of the shroud 34 to that of the impeller 28 generally is about 3:1 to about 1.1:1, preferably approximately 1.5:1. The relationship of the shroud and impeller diameters may be further particularized by the ESI and SEI indices discussed above.

In contrast to the shroud in a conventional agitated flotation cell, the openings 36 generally are larger in number and smaller in diameter, in order to provide an increased area for shearing, although an equivalent effect can be achieved using openings of large aspect ratio, such as slits. When such circular openings are employed, the openings 36 generally are uniformly distributed over the wall of the shroud 34 and usually are of equal size. The equivalent diameter of the openings 36 often is less than about one inch (25 mm) and generally should be as small as possible without plugging, preferably about ⅜ to about ⅝ inch (about 10 to about 15 mm) in diameter, in order to provide for the required gas flow therethrough. When the openings 36 are of non-circular geometrical shape and of aspect ratio which is approximately unity, then the area of each such opening 36 generally is, less than the area of a circular opening having an equivalent diameter of about one inch (25 mm), preferably about ⅜ to about ⅝ inch (about 10 to about 15 mm). The openings have sharp corners to promote shearing of the gas bubbles passing through the openings and contacting the edges.

The openings 36 are dimensioned to permit a gas flow rate therethrough measured at atmospheric pressure corresponding to less than about 0.02 lb/min/shroud opening, generally down to about 0.004 lb/min/shroud opening. As noted earlier, the gas flow rate may be higher at or near the upper limit of capacity of the unit. Preferably, the gas flow rate through the shroud openings is about 0.005 to about 0.007 lb/min/opening in the shroud. As noted above, in general, the gas velocity index is at least about 18 per second per opening in the shroud, preferably at least about 24 per second per opening, and more preferably at least about 30 per second per opening.

The shroud 34 is illustrated as extending downwardly for the height of the impeller 28. It is possible for the shroud 34 to extend below the height of the impeller 28 or for less than its full height, if desired.

In addition, in the illustrated embodiment, the impeller 28 is located a distance corresponding to approximately half the diameter of the impeller 28 from the bottom wall of the reactor 10. It is possible for this dimension to vary from less than about 0.25:1 to about 1:1 or greater of the proportion of the diameter dimension of the impeller. This spacing of the impeller 28 from the lower wall allows liquid phase to be drawn into the area between the impeller 28 and the shroud 34 from the mass in the reactor. If desired, a draft tube may be provided extending into the body of the liquid phase from the lower end of the impeller, to guide liquid into the region of the impeller.

By distributing the gases in the form of bubbles and effecting shearing of the bubbles in contact with the iron chelate solution within the shroud 34 and during passage through the openings 36 therein, rapid mass transfer occurs and the hydrogen sulfide is rapidly oxidized to sulfur. The reaction occurs largely in the immediate region of the impeller 28 and shroud 34 and forms sulfur and hydrogen sulfide-depleted gas bubbles.

The sulfur particles initially remain suspended in the turbulent reaction medium but grow in the body of the reaction medium to a size which enables them to be floated by the hydrogen sulfide-depleted gas bubbles. When the sulfur particles have reached a size in the range of about 10 to about 50 microns in diameter, they possess sufficient inertia to penetrate the boundary layer of the gas bubbles to thereby enable them to be floated by the upwardly flowing hydrogen sulfide-depleted gas bubbles.

Other odiferous components of the hydrogen sulfide-containing gas stream, such as mercaptans, disulfides and odiferous nitrogenous compounds, such as putrescene and cadaverene, also may be removed by adsorption on the sulfur particles.

At the surface of the aqueous reaction medium, the floated sulfur accumulates as a froth 38 and the hydrogen sulfide-depleted gas bubbles enter an atmosphere 40 of such gas above the reaction medium 42. The presence of the froth 38 tends to inhibit entrainment of an aerosol of reaction medium in the atmosphere 40.

A hydrogen sulfide-depleted gas flow outlet 44 is provided in the upper closure 16 to permit the treated gas stream to pass out of the reactor vessel 12.

An adequate freeboard above the liquid level in the reaction vessel is provided greater than the thickness of the sulfur-laden froth 38, to further inhibit aerosol entrainment.

Paddle wheels 46 are provided adjacent the edges of the vessel 12 in operative relation with the sulfur-laden froth 38, so as to skim the sulfur-laden froth from the surface of the reaction medium 42 into collecting launder 48 provide at each side of the vessel 12. The skimmed sulfur is removed periodically or continuously from the launders 48 for further processing.

The sulfur is obtained in the form of froth containing about 5 to about 30 wt. % sulfur in reaction medium. Since the sulfur is in the form of particles of a relatively narrow particle size, the sulfur is readily separated from the entrained reaction medium, which is returned to the reactor 10.

The gas-liquid contact apparatus 10 provides a very compact unit which rapidly and efficiently removes hydrogen sulfide from gas streams containing the same. Such gas streams may have a wide range of concentrations of hydrogen sulfide. The compact nature of the unit leads to considerable economies, both in terms of capital cost and operating cost, when compared to conventional hydrogen sulfide-removal systems.

There has previously been described in U.S. Pat. No. 3,993,563 a gas ingestion and mixing device of the general type described herein. In that reference, it is indicated that, for the device described therein, if an increase in the-rotor speed is made in an attempt to obtain greater gas-liquid mixing action, then it is necessary to employ a baffle in the standpipe in order to obtain satisfactory gas ingestion. As is apparent from the description herein, such a baffle is not required in the present invention.

However, with larger size units designed to handle large volumes of gas, it may be desirable to provide a conical perforated hood structure above the impeller-shroud combination to quieten the surface of the liquid medium in the vessel.

EXAMPLES

Example 1

A pilot plant apparatus was constructed as schematically shown in FIG. 1 and was tested for efficiency of removal of hydrogen sulfide from a gas stream containing the same.

The overall liquid capacity of the tank was, 135 L. The standpipe had an inside diameter of 7½ in. (19 cm), and the impeller consisted of six blades and had a diameter of 5½ in. (14 cm) and a height of 6¼ in. (16 cm) and was positioned 2¼ in. (5.7 cm) from the base of the tank.

The pilot plant apparatus, fitted with a standard froth flotation dispenser and impeller combination, was charged with 110 L of an aqueous solution which contained 0.016 mol/L of ethylenediaminetetraacetic acid, iron-ammonium complex and 0.05 mol/L of sodium hydrogen carbonate. The pH of the aqueous medium was 8.5. The dispenser consisted of a stationary cylinder of outside diameter 12 in. (30 cm), height 5¾ in. (14.6 cm) and thickness ¾ in. (1.9 cm) in which was formed 48 circular openings each 1.25 in. (3.8 cm) in diameter, for a total circumferential length of 188 inches.

Air containing 4000 ppm by volume of hydrogen sulfide was passed through the apparatus via the standpipe at a rate of 835 L/min. at room temperature while the impeller in the aqueous medium rotated at a rate of 733 rpm., corresponding to a blade tip velocity of about 211 in/sec. (5.4 m/s). The gas velocity index through the dispenser openings was 11.7 per second per opening in the dispenser. (The gas flow rate was 0.05 lb/min/opening.) Over the one and a half hour test period, 99.5% of the hydrogen sulfide was removed from the gas stream, leaving a residual amount of $H_2S$ in the gas stream of 20 ppm. Sulphur was formed and appeared as a froth on the surface of the aqueous solution and was skimmed from the surface using the paddle wheels. Simultaneous removal of hydrogen sulfide from the gas stream and recovery of the sulfur produced thereby, therefore, was effected.

During the test period, the pH of the aqueous solution dropped to 8.3 but no additional alkali was added during this period. Further, no additional catalyst was added during the period of the test.

Example 2

The procedure of Example 1 was repeated with an increased impeller rotation rate and higher gas flow rate.

Air containing 4000 ppm by volume of hydrogen sulfide was passed through the apparatus via the standpipe at a rate of 995 L/min. at room temperature while the impeller in the aqueous medium rotated at a rate of 1772 rpm corresponding to a blade tip velocity of about 510 in/sec. (13 m/s). The gas velocity index through the dispenser openings was 13.7 per second per opening in the dispenser. (The gas flow rate was 0.06 lb/min/opening.) Over the two hour test period 99.7% of the hydrogen sulfide was removed from the gas stream, leaving a residual amount of $H_2S$ of 11 ppm. Sulfur was formed and appeared as a froth on the surface of the aqueous solution and was skimmed from the surface. Simultaneous removal of hydrogen sulfide from the gas stream and recovery of the sulfur produced thereby, therefore, was effected.

During the test period, the pH of the aqueous solution dropped to 8.3 but no additional alkali was added during this period. Further, no additional catalyst was added during this period of the test.

Example 3

Figure 2:
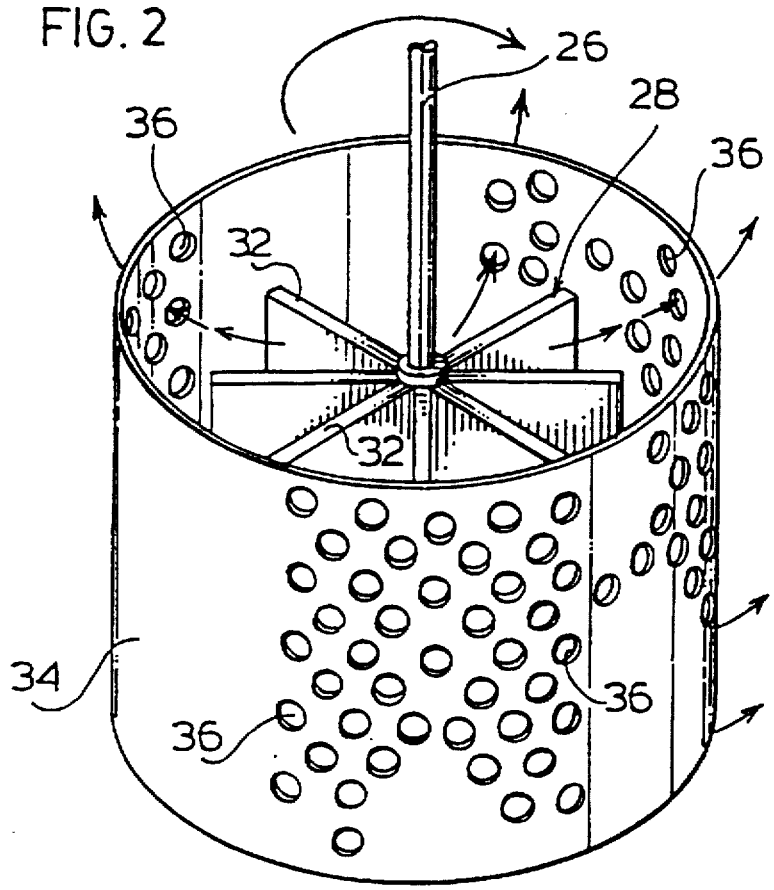
FIG. 2 is a detailed perspective view of the impeller and shroud of the apparatus of FIG. 1.
Figure 3:
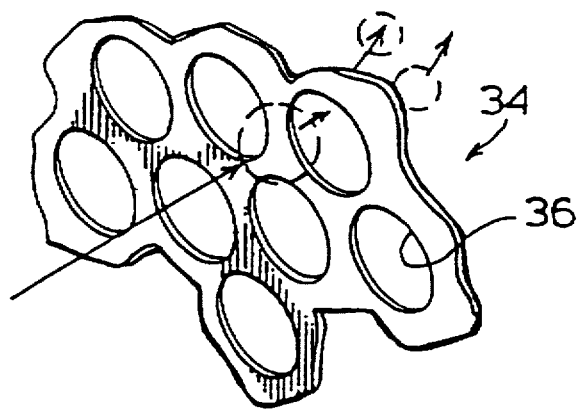
FIG. 3 is a close-up perspective view of a portion of the shroud of FIG. 2.

The pilot plant apparatus was modified and fitted with a shroud and impeller combination as illustrated in FIG. 2, was charged with 110 L of an aqueous solution which contained 0.016 mol/L of ethylenediaminetetraacetic acid, iron-ammonium complex and 0.05 mol/L sodium hydrogen carbonate. The pH of the aqueous solution was 8.5. The shroud consisted of a stationary cylinder of outside diameter 12¾ in. (32.4 cm), height in. (21.6 cm), and thickness ½ in. (1.3 cm) in which was formed 670 openings each of ⅜ in. (1 cm) diameter for a total circumferential length of 789 inches (20 m). Vertical baffles extending vertically from top to bottom of the shroud were provided on the internal wall equally arcuately spaced, ten in number with a ¼-inch×¼-inch (0.6×0.6 cm) space cross section. The impeller was replaced by one having a diameter of 6½ in. (16.5 cm), an increase of one inch. The other dimensions remained the same. As a result of these changes, the self induction volumetric flow rate increased from 14 cfm (396 L/min) in the unmodified unit to about 30 cfm (850 L/min).

Air containing 4000 ppm by volume of hydrogen sulfide was passed through the apparatus via the standpipe at a rate of 995 L/min. at room temperature while the impeller in the aqueous medium rotated at a rate of 1754 rpm., corresponding to a blade tip velocity of about 597 in/sec. (15 m/s). The gas velocity index through the shroud was 36.3 per second per opening. (The gas flow rate was 0.004 lb/min/opening.) Over the two hour test period 99.998% of the hydrogen sulfide was removed from the gas stream, leaving a residual amount $H_2S$ of less than 0.1 ppm. Sulphur was formed and appeared as a froth on the surface of the aqueous solution and was skimmed from the surface. Simultaneous removal of hydrogen sulfide from the gas stream and recovery of the sulfur produced thereby, therefore, was effected.

During the test period, the pH of the aqueous solution remained relatively constant at 8.5. No additional alkali or catalyst was added during the period of this test.

As may be seen from a comparison of the results presented in Examples 1, 2 and 3, it is possible to remove hydrogen sulfide with greater than 99% efficiency using an agitated flotation cell which is provided with a conventional dispenser and impeller construction (Examples 1 and 2), as already described in Canadian Patent No. 1,212,819. However, by employing a higher blade tip velocity than in the conventional cell, as in Example 2, a modest increase in efficiency can be achieved.

However, as seen in Example 3, with a shroud modified as described therein to provide the critical gas flow rate and using the critical blade tip velocity, efficiency values over 99.99% can be achieved comprised with that of 99.5% in the conventional unmodified cell., leaving virtually no residual hydrogen sulfide in the gas stream.

To summarize, 4000 ppm $H_2S$ in the gas feed can be reduced to residual values of 20, 11 and less than 0.1 ppm by the processes illustrated in Examples 1, 2 and 3 respectively.

Example 4

The pilot plant apparatus of FIG. 1 was tested for efficiency of removal of sulfur dioxide from a gas stream containing the same. The elements of the pilot plant apparatus were dimensioned as described in Example 3.

The pilot plant apparatus was charged with 110 L of an aqueous slurry containing 13.2 kg of CaO and 3450 g of $MgSO_4 \cdot 7H_2O$. Air, containing varying amounts of sulfur dioxide was passed through the apparatus via the standpipe at varying flow rates at room temperature, while the impeller in the aqueous slurry rotated at a rate varying from 1760 to 1770 rpm, corresponding to a blade tip velocity of 599 to 602 in/sec. (15.2 to 15.3 m/s). The corresponding gas velocity indices through the shroud were from 31.1 to 124.5 per second per opening. (The gas flow rates were 0.003 to 0.01 lb/min/opening.)

A series of one hour runs was performed and the residual $SO_2$ concentration was measured after 45 minutes. The results obtained are set forth in the following Table I:

Table I

| Gas Flow Rate | $SO_2$ Concentration | | |
|---|---|---|---|
| (cfm) | In *[1] (ppmv) | Out *[2] | rpm |
| 30 | 1000 | <0.4 | 1760 |
| 30 | 5000 | <0.4 | 1760 |
| 30 | 7000 | <0.4 | 1760 |
| 30 | 10000 | 0.6 | 1760 |
| 60 | 900 | <0.4 | 1770 |
| 75 | 1000 | <0.4 | 1760 |
| 100 | 1000 | 0.8 | 1763 |
| 120 | 1000 | 5.6 | 1770 |

Notes:
*[1] Concentration values vary approximately ±10%.
*[2] Concentration values vary approximately ±0.2 ppm by volume.

As may be seen from this data, highly efficient (>99.99%) removal of sulfur dioxide from the gas stream was obtained using a lime slurry, even at high sulfur dioxide concentrations and less efficient removal were observed only at high gas flow rate.

Example 5

The procedure of Example 4 was repeated using 110 L of an aqueous slurry of 13.2 kg of ground calcium carbonate and 3450 g of $MgSO_4 \cdot 7H_2O$. In these experiments, the impeller was rotated at a speed of 1770 to 1775 rpm, corresponding to a blade tip velocity of 602 to 604 in/sec. (15.3 to 15.4 m/s). The corresponding gas velocity index through the shroud were 31.1 to 103.8 per second per opening. (The gas flow rates were 0.003 to 0.01 lb/min/opening). The results obtained are set forth in the following Table II:

TABLE II

| Gas Flow Rate | $SO_2$ Concentration | | |
|---|---|---|---|
| (cfm) | In[1] (ppmv) | Out[2] | rpm |
| 30 | 900 | <0.4 | 1770 |
| 30 | 2000 | <0.4 | 1770 |
| 30 | 3000 | <0.4 | 1770 |
| 30 | 5000 | <0.4 | 1770 |
| 30 | 9000 | <0.4 | 1770 |
| 30 | 10000 | <0.4 | 1770 |
| 45 | 1000 | <0.4 | 1773 |
| 60 | 1000 | <0.4 | 1775 |
| 75 | 1050 | <0.4 | 1775 |
| 100 | 1000 | 5.25 | 1775 |

Notes:
1. Concentration values vary approximately ± 10%.
2. Concentration values vary approximately ± 0.2 ppm by volume except for last run, approximately ± 1 ppm by volume.

As may be seen from this data, highly efficient (>99.99%) removal was obtained using a ground limestone slurry, even at high sulfur dioxide concentrations and less efficient removal were observed only at high gas flow rate.

Example 6

A bench scale reaction was set up corresponding in construction to the apparatus of FIG. 1. 4L of the catalyst solution described in Example 3 was charged to the reactor. An off-gas stream from a feather cooker of a meat rendering plant was fed to the reactor along with air and, over the test period, the pH of the catalyst solution, the impeller speed (rpm), the pressure difference between the reactor standpipe and the atmosphere and the temperature of the off-gas stream were all monitored. Gas analysis for hydrogen sulfide and methanethiol concentrations were effected for reactor feed and exit streams.

The separate runs were effected and the results obtained are summarized in the following Tables III and IV separately:

TABLE III

| Time | pH | rpm | $\Delta P$ "$H_2O$ | T °C. | $H_2S_{IN}$ ppmv | $H_2S_{OUT}$ ppmv | Q L/min |
|---|---|---|---|---|---|---|---|
| 11:20 | 8.5 | 2120 | −7.6 | 33 | 900 | — | 26 |
| 12:00 | 8.9 | 1810 | −6.8 | 30 | 150 | <0.1 | 20 |
| 13:00 | 8.9 | 2060 | −7.6 | 30 | 33 | — | 25 |
| 14:00 | 8.7 | 2190 | −8.2 | 37 | 550 | <0.1 | 28 |
| 15:00 | 8.8 | 2020 | −9.8 | 40 | 85 | <0.1 | 31 |
| 16:00 | 8.7 | 2060 | −7.6 | 37 | 1400 | <0.1 | 25 |
| 17:00 | 8.5 | 2370 | −8.2 | 50 | 700 | <0.1 | 30 |

TABLE IV

| Time | pH | rpm | ΔP "H₂O | T °C. | H₂S$_{IN}$ ppmv | H₂S$_{OUT}$ ppmv | Q L/min |
|---|---|---|---|---|---|---|---|
| 10:10 | 9.0 | 2230 | −9.2 | 36 | — | — | 32 |
| 11:00 | 8.8 | 2200 | −8.5 | 44 | 1100 | <0.1 | 30 |
| 12:00 | 8.6 | 2200 | −8.4 | 45 | 2000 | <0.1 | 29 |
| 13:00 | 8.6 | 2200 | −8.7 | 48 | 7500 | <0.1 | 30 |
| 14:00 | 8.7 | 2209 | −8.5 | 49 | 250 | <0.1 | 30 |
| 15:00 | 8.4 | 2270 | −7.4 | 46 | 200 | <0.1 | 27 |
| 16:00 | 8.3 | 2300 | −8.2 | 48 | 1400 | <0.1 | 29 |
| 17:00 | 8.5 | 2320 | −7.2 | 40 | 85 | <0.1 | 25 |

In these Tables, the following abbreviations are used:
pH: of the catalyst solution
rpm: of the reactor impeller
ΔP: pressure difference between the reactor stand-pipe and the atmosphere ("H₂O)
T: temperature of the slip-stream at the point where it is removed from the feather cooker off-gas (°C.)
H₂S$_{IN}$: the hydrogen sulphide concentration in the reactor feed gas stream (ppmv)
H₂S$_{OUT}$: the hydrogen sulphide concentration in the reactor exit gas stream (ppmv)
Q: the volumetric flow rate of the reactor feed gas stream (L/min)

During the run described in Table III, the methanethiol concentration at 14:00 in the reactor inlet and outlet gas streams was 8 ppmv and <0.1 ppmv respectively. When the reactor was stopped at 17:15, the pH of the catalyst solution was 8.5 and the pressure inside the off-gas duct was −3.2"H₂O.

During the run described in Table IV, the methanethiol concentration at 12:00 in the reactor inlet and outlet gas streams was 5 ppmv and <0.1 ppmv respectively. When the reactor was stopped at 17:00, the pressure inside the off-gas pipe was −5.4"H₂O.

After approximately 20 minutes of operation from start-up of the run described in Table III, sulfur particles clouded the catalyst solution and after about one hour a froth layer of elemental sulfur developed on the surface of the catalyst solution. During the two runs, no sulfur was removed from the reactor during the runs except for sulfur suspended in solution when catalyst samples were withdrawn from the reactor. The sulfur particles increased in size as the tests proceeded as observed by the length of time required for the sulfur particles to settle in the catalyst sample removed from the reactor.

As can be seen from the results set forth in Tables III and IV, a variable feed concentration of hydrogen sulfide was decreased to below the limit of detection of the test equipment (0.1 ppmv) and the concentration of highly odiferous methanethiol was below the level of detection of the test equipment (0.1 ppmv), and indeed below the level of detection by the operator.

The highly odiferous off-gas stream contained a variety of nitrogenous and sulfurous organic compounds, in addition to hydrogen sulfide. These compounds which included the methanethiol, probably were removed from the gas stream by adsorption on the sulfur particles and the only detectable odour in the exit gas stream from the reactor was that of ammonia. This latter observation was confirmed by GC/MS analysis of the inlet and outlet streams, which showed many compounds besides hydrogen sulfide in the gas stream entering the reactor which were not detected in the exiting gas stream.

Example 7

A pilot scale unit was set up corresponding in construction to that shown in FIG. 1. There were employed an impeller of 13 inches (33 cm) diameter of 12¾ (32.4 cm) inches height, a shroud of outside diameter of 23⅞ inches (60.6 cm) and a height of 13 inches (33 cm), with the shroud having 1824 ½-inch (12 mm) diameter openings, and vertical baffles having ½-inch×½-inch (12 mm×12 mm) cross section.

The modified apparatus was operated to test the mass transfer of oxygen from gas phase to liquid phase by employing a readily oxidizable component dissolved in the liquid phase, namely sodium sulfite. The apparatus was operated at 940 rpm, providing a blade speed velocity of 627 in/sec. (16 m/s) and a GVI value of 28.6, 60.2 and 88.0 per second per opening for three runs (see Table V).

In this procedure, the apparatus first was operated for 10 minutes in the absence of sodium sulfite and the power requirement (P), standpipe pressure ($\Delta P_s$), gas flow rate ($Q_g$) and quiecsent water level ($L_a$) after shutdown (to determine liquid volume $V_L$) were measured. 1.5 kg of sodium sulfite was added and the reactor operated until a non-zero dissolved oxygen concentration was detected, signifying that the sodium sulfite had been consumed.

From the latter time (t), the $K_La$, i.e. the mass transfer coefficient, may be determined from the relationship: $\Delta C \cdot K_L a \cdot V_L \cdot t$ =oxygen consumed in Kg ($\Delta O_2$) where $\Delta C$ is determined from the equilibrium dissolved oxygen level after completion of the run. $\Delta C = C_I - O$ where $C_I$ is the equilibrium-oxygen concentration in the liquid phase.

Three runs have been performed, as summarized in the following Table V:

TABLE V

| | Q₁ (cfm) | ΔP$_f$ ("H₂O) | P (HP) | L₁ (mm) | C₁ (mg/L) | t (secs) | K$_L$a (hr⁻¹) | ΔO₂ (kg) |
|---|---|---|---|---|---|---|---|---|
| Run No. 1 | 178 | 0 | 13.8 | 576 (1.07 m³) | 8.6 | 59.2 | 1340 | 0.203 |
| Run No. 2 | 374 | 4.5 | 8.0 | 484 (0.837 m³) | 8.6 | 61.2 | 1300 | 0.159 |
| Run No. 3 | 553 | 4.5 | 7.5 | 463 (0.799 m³) | 8.6 | 53.8 | 1480 | 0.152 |

As may be seen from these results, high levels of mass transfer were observed for different flow rates of air to the reactor.

Example 8

This Example illustrates the removal of hydrogen sulfide from gas streams using ferric hydroxide catalyst.

The procedure of Example 3 was repeated using the equipment described in Example 7, except that in place of the iron chelate component of the solution, there was used an aqueous phase having an iron concentration of 0.465 g/L.

1114 L of water were heated to 65° C. and 0.0083 mol/L of ferric chloride and 0.025 mol/L of sodium hydroxide were added to the heated solution, along with 0.05 mol/L of sodium hydrogen carbonate to form a precipitate of iron hydroxide.

Air containing an average of 134 ppmv of hydrogen sulfide and saturated with water vapour was passed through the apparatus for a 10-hour period via the standpipe at an average volumetric gas flow rate of 407 cfm into contact with the aqueous medium which had a temperature of about 65° C. throughout the reaction. The pressure drop (▲P) observed was an average of 9.1 in $H_2O$ with a power consumption of 7.0 hp. The impeller was rotated at an average speed of 942 rpm, corresponding to a blade tip velocity of 641 in/sec. (16.3 m/s). The average gas velocity index through the shroud was 65.5 per second per opening.

The results obtained are summarized in the following Table VI:

TABLE VI

| Time | ω (rpm) | T (°C.) | Q (acfm) | ▲P (in $H_2O$) | pH | $H_2S_{IN}$ (ppmv) | $H_2S_{OUT}$ (ppmv) |
|---|---|---|---|---|---|---|---|
| 10:30 | 942 | 64 | 422 | 8.9 | | | |
| 11:30 | 943 | 61 | 426 | 8.8 | 9.7 | 112 | 5.0 |
| 12:30 | 941 | 64 | 418 | 8.7 | | 132 | 3.0 |
| 13:30 | 941 | 65 | 406 | 8.9 | 9.8 | 134 | 10.0 |
| 14:30 | 941 | 65 | 411 | 9.1 | | 140 | 12.0 |
| 15:30 | 942 | 65 | 406 | 9.1 | 9.9 | 138 | 13.0 |
| 16:30 | 942 | 65 | 406 | 9.1 | | 136 | 13.0 |
| 17:30 | 941 | 65 | 406 | 9.1 | 9.8 | 134 | 13.0 |
| 18:30 | 941 | 65 | 389 | 9.2 | | 128 | 14.0 |
| 19:30 | 942 | 65 | 381 | 9.4 | 9.8 | 142 | 15.0 |
| 20:30 | 941 | 66 | 407 | 9.4 | | 142 | 18.0 |
| Average | 942 | 65 | 407 | 9.1 | | 134 | |

The removal efficiency obtained was not as high as achieved using the chelated iron, as reported in Example 3. The difference in results may be attributed to a difference in oxidation potential between iron hydroxide and iron EDTA, resulting in a slower rate of reaction. A further possibility is that relatively large iron hydroxide flocs were formed during the batch precipitation procedure, bearing less iron available to function as a catalyst for the reaction. However, it has not been possible previously to use iron hydroxide to achieve any significant degree of hydrogen sulfide removal. Sulfur produced by the oxidation process was in fine particulate form and had a reddish-brown colour, suggesting adsorption of iron hydroxide onto the sulfur particles.

Example 9

The procedure of Example 8 was repeated except that the apparatus of Example 3 was employed. To 110 L of water were added 0.0090 mol/L of ferric chloride, 0.027 mol/L of NaOH and 0.05 mol/L of $NaHCO_3$, to cause precipitation of iron hydroxide in the aqueous phase in an amount of 0.5 g/L of Fe. Air containing varying qualities of hydrogen sulfide was passed through the apparatus over a 4-hour period at a volumetric gas flow rate of 50 cfm (1416 L/min). The impeller was rotated at a rate corresponding to an average impeller tip speed of 599 in/sec. (15.2 m/s). The average gas velocity index through the shroud was 51.9 per second per opening.

The results obtained are summarized in the following Table VII:

TABLE VII

| Time | pH | $H_2S_{IN}$ ppm | $H_2S_{OUT}$ ppm |
|---|---|---|---|
| 1:30 pm (start, T = 9° C.) | | | |
| 2:00 | 10.00 | 160 | 0 |
| 2:30 | 9.83 | 210 | 2 |
| 3:00 | 9.72 | 180 | 2 |
| 3:30 | 9.65 | 160 | 4 |
| 4:00 | 9.62 | 170 | 4 |
| (Increased $H_2S_{IN}$) | | | |
| 4:30 (T = 17° C.) | 9.55 | 450 | 8 |
| 5:00 | 9.52 | 450 | 9 |
| 5:30 | 9.52 | 450 | 10 |

Example 10

The procedure of Example 9 was repeated, except the iron hydroxide for the oxidation was prepared from ferric sulfite rather than ferric chloride. In this Example, 0.0045 mol/L of $Fe_2(SO_4)_3$, 0.027 mol/L of NaOH and 0.05 mol/L of $NaHCO_3$ were added to 110 L of water to form an aqueous medium again containing 0.5 g/L Fe.

Air containing varying quantities of hydrogen sulfide was passed through the apparatus over a 5-hour period at a volumetric gas flow rate of 50 cfm (1416 L/min). The impeller was rotated at a rate corresponding to an average impeller tip speed of 599 in/sec. (15.2 m/s). The gas velocity index through the shroud was 65.5 per second per opening.

The results obtained are summarized in the following Table VIII:

TABLE VIII

| Time | pH | $H_2S_{IN}$ ppmv | $H_2S_{OUT}$ ppmv |
|---|---|---|---|
| 11:30 | 10.24 | | |
| 12:00 | 9.74 | 500 | 3 |
| 12:30 | 9.48 | 600 | 5 |
| 13:00 | 9.43 | 600 | 7 |
| 13:30 | 9.36 | 550 | 8 |
| (Increased $H_2S_{IN}$) | | | |
| 14.00 | 9.10 | 1550 | 25 |
| 14:30 | 9.19 | 1100 | 16 |
| 15:00 | 9.19 | 1150 | 9 |
| 15:30 | 9.14 | 1150 | 19 |
| (Decreased $H_2S_{IN}$) | | | |
| 16:00 | 9.20 | 550 | 8 |
| 16:30 | 9.13 | 550 | 9 |

Higher removal efficiencies were observed in Examples 9 and 10 than in the case of Example 8. The sulfur produced at the lower temperature employed in Examples 9 and 10 were not coated with iron hydroxide, in contrast to Example 8.

Example 11

An experimental unit was set up to test the feasibility of removing sulfur dioxide and hydrogen sulfide from gas streams by a liquid Claus process. An experimental unit as described in the aforementioned U.S. Ser. No. 709,158 using two impeller-shroud combination. Sulfur dioxide was fed to one of the impeller-shroud combinations while hydrogen sulfide was fed to the other, under a variety of operating conditions, summarized in the following Table IX:

TABLE IX

| Run # | Sulphite Source | Average pH | [PO₄⁻³] mol/L | Average [H₂S] in | Average [SO₂] in |
|---|---|---|---|---|---|
| 1 | sat'd w/ NaHSO₃ | 6.89 | 0.03 | 400 ppm | 200 ppm |
| 2 | none | 7.48 | 0.08 | 400 ppm | 200 ppm |
| 3 | sat'd w/ NaHSO₃ | 7.48 | 0.3 | 400 ppm | 200 ppm |
| 4 | sat'd w/ NaHSO₃ | 3.7 | 1.1 | 5000 ppm | 1000 ppm |
| 5 | 60 ml H₂SO₃ | 2.5 | 1.1 | 2500 ppm | 500 ppm |
| 6 | 60 ml H₂SO₃ | 2.6 | 1.1 | 2500 ppm | 500 ppm |
| 7 | 60 ml H₂SO₃ | 2.7 | 1.1 | 5000 ppm | 1000 ppm |
| 8 | (sol'n) (#7) | 2.7 | 1.1 | 5000 ppm | 1000 ppm |

Removal efficiencies attained are summarized in the following Table X:

TABLE X

| Run # | Average Removal (%) of H₂S | Average Removal (%) of SO₂ |
|---|---|---|
| 1 | 97.2 | 99.7 |
| 2 | 82.6 | 99.8 |
| 3 | 83.6 | 99.8 |
| 4 | 63.6 | 93.4 |
| 5 | 65.2 | 93.2 |
| 6 | 59.8 | 90.0 |
| 7 | 64.1 | 92.6 |
| 8 | 60.5 | 90.2 |

These results show the effect of pH on removal efficiency, with $H_2S$ and $SO_2$ removals being lower at the lower pH levels. These results further show that the highest removal efficiency is achieved in the pH range of 6.5 to 7.5. However, the preferred range for sulfur production is pH 3.5 to 5.

SUMMARY OF DISCLOSURE

In summary of this disclosure, the present invention provides novel method and apparatus for effecting gas-liquid contact for distribution of a gaseous phase in a liquid phase, particularly for the removal of components from gas streams, such as by chemical reactions or physical separation and, if desired, for separating flotable by-products of such reactions, or for effecting removal of components from the liquid phase. Modifications are possible within the scope of this invention.

What we claim is:

1. A process for the removal of hydrogen sulfide from a gas stream containing hydrogen sulfide, which comprises:
   oxidizing a portion of the hydrogen sulfide therein to form sulfur dioxide therefrom and to produce an oxidized gas stream containing sulfur dioxide and a stoichiometric excess of hydrogen sulfide,
   reacting substantially all said sulfur dioxide in said oxidized gas stream with hydrogen sulfide remaining in said oxidized gas stream in a first liquid phase to form sulfurous material therefrom contained in the first liquid phase and to produce a further gas stream having a decreased and residual hydrogen sulfide content,
   oxidizing substantially all hydrogen sulfide remaining in said further gas stream in a second liquid phase to form a sulfurous material therefrom contained in the second liquid phase and to produce a gas stream substantially free from gaseous sulfur compounds, and
   venting said gas stream substantially free from gaseous sulfur compounds.

2. A process for the removal of hydrogen sulfide from a gas stream containing hydrogen sulfide, which comprises:
   (A) oxidizing a portion of the hydrogen sulfide therein to form sulfur dioxide therefrom and to produce an oxidized gas stream containing sulfur dioxide and a stoichiometric excess of hydrogen sulfide;
   (B) reacting substantially all said sulfur dioxide in said oxidized gas stream in a first liquid phase in a first reaction vessel to form a sulfurous material therefrom contained in the liquid phase and to produce a further gas stream having a decreased hydrogen sulfide content by the steps of:
   (a) feeding said oxidized gas stream to said first reaction vessel in which is located the first liquid phase,
   (b) rotating a first impeller comprising a plurality of blades about a generally vertical axis at a submerged location in said first liquid phase so as to induce flow of said oxidized gas stream along a generally vertical flow path from external to said first reaction vessel to said submerged location,
   (c) surrounding said first impeller with a first shroud through which are formed a first plurality of openings while said first impeller is rotated at a speed corresponding to a first blade tip velocity of at least about 350 in/sec so as to generate sufficient shear forces between said first impeller blades and said first plurality of openings in first said shroud to distribute said oxidized gas stream as gas bubbles in said first liquid phase to interior of said first shroud, and to effect intimate contact of said oxidized gas stream and first liquid medium at said submerged location so as to form a first gas-liquid mixture of gas bubbles in said first liquid phase contained within the shroud while effecting shearing of said first gas-liquid phase within said first shroud and to react substantially all of the sulfur dioxide with hydrogen sulfide in the oxidized gas stream, and
   (d) flowing said first gas-liquid mixture from the first shroud through and in contact with the first plurality of openings therein into the body of the first liquid phase external to the first shroud at a first gas velocity index at approximately atmospheric pressure of at least about 18 per second per opening in the first shroud, so as to effect further shearing of the first gas-liquid mixture and further intimate contact of said oxidized gas stream and liquid phase whereby any oxidation of sulfur dioxide not effected in the interior of the first shroud is completed in the region of the first liquid phase adjacent to the exterior of the first shroud,
   said first gas velocity index (GVI) being determined by the expression:

$$GVI = \frac{QP}{4nA^2}$$

wherein Q is the volumetric flow rate of said oxidized gas stream (m³/n), n is the number of openings in the first shroud, A is the area of an individual opening (m²) and P is the length of the perimeter of an individual opening, wherein said reaction of substantially all of said sulfur dioxide in said first reaction vessel is carried out at an Effective Shear Index (ESI) value of about 1 to about 2500, as determined by the $$ESI = \frac{GVI}{V_i} \times \frac{(D_s - D_i)}{2} \times 100$$

relationship: where GVI is the first Gas Velocity Index (/s), $V_i$ is the first blade tip velocity (m/s) for the blades of the first impeller, $D_s$ is the inside diameter (m) of the first shroud, $D_i$ is the outside diameter (m) of the first impeller, and at a Shear Effectiveness Index (SEI) value of about 1 to about 10, as determined by the relationship:

$$SEI = \frac{Q}{\pi h D_i V_i} \times 100$$

where Q is the gas flow rate of the oxidized gas stream to the first impeller (m³/s), h is the height (m) of the first impeller blades, $D_i$ is the outside diameter (m) of the first impeller and $V_i$ is the first impeller blade tip velocity (m/s);

(C) venting said further gas stream having a decreased hydrogen sulfide content from a gas atmosphere above the liquid level in said first reaction vessel;

(D) oxidizing substantially all hydrogen sulfide remaining in said further gas stream in a second liquid phase in a second reaction vessel to form a sulfurous material therefrom by the steps of:

(e) feeding said further gas stream to said second reaction vessel in which is located said second liquid phase, (f) rotating a second impeller comprising a plurality of blades about a generally vertical axis at a submerged location in said second liquid phase so as to induce flow of said further gas stream along a generally vertical flow path from external to said second reaction vessel to said submerged location, (g) providing an oxygen-containing gas stream at said submerged location, (h) surrounding said second impeller with a second shroud through which are formed a second plurality of openings while said second impeller is rotated at a speed corresponding to a second blade tip velocity of at least 350 in/sec. so as to generate sufficient shear forces between said second impeller blades and said second plurality of openings in said second shroud to distribute said further gas stream and said oxygen-containing gas as gas bubbles in said second liquid phase to the interior of said second shroud, and to effect intimate contact of said further gas stream, said oxygen-containing gas stream and second liquid phase at said submerged location so as to form a second gas-liquid mixture of gas bubbles in said second liquid phase contained within the shroud while effecting shearing of said second gas-liquid mixture within said second shroud and to effect oxidation of substantially all the hydrogen sulfide in said further gas stream, and (i) flowing said second gas-liquid mixture from the second shroud through and in contact with the second plurality of openings therein into the body of the second liquid phase external to the second shroud at a second gas velocity index at approximately atmospheric pressure of at least 18 per second per opening in said second shroud, so as to effect further shearing of the second gas-liquid mixture and further intimate contact of said further gas stream, oxygen-containing gas stream and second liquid phase whereby any removal of hydrogen-sulfide from the gas stream not effected in the interior of the second shroud is completed in the region of the second liquid phase adjacent to the exterior of the second shroud, said second gas velocity index (GVI) being determined by the expression:

$$GVI = \frac{QP}{4nA^2}$$

where Q is the volumetric flow rate of said further gas stream (m³/s), n is the number of openings in the second shroud, A is the area of the opening (m²) and P is the length of the perimeter of the opening (m), wherein said reaction of substantially all said hydrogen sulfide in said further gas stream is carried out at an Effective Shear index (ESI) value of 1 to 2500, as determined by the relationship:

$$ESI = \frac{GVI}{V_i} \times \frac{(D_s - D_i)}{2} \times 100$$

in which GVI is the second Gas Velocity Index (/s), $V_i$ is the second blade tip velocity (m/s) for the blades of the second impeller, $D_s$ is the inside diameter (m) of the second shroud and $D_i$ is the outside diameter (m) of the second impeller, and at a Shear Effectiveness Index (SEI) value of 1 to 10, in which the Shear Effectiveness Index is determined by the relationship:

$$SEI = \frac{Q}{\pi h D_i V_i} \times 100$$

in which Q is the gas flow rate of the further gas stream to the second impeller (m³/s), h is the height (m) of the second impeller blades, $D_i$ is the outside diameter (m) of the second impeller, and $V_i$ is the second impeller blade tip velocity (m/s); and (E) venting a gas stream substantially free from gaseous sulfur compounds from said second reaction vessel.

3. The process of claim 2 wherein said liquid medium comprises liquid sulfur, tricresyl phosphate or an aqueous medium.

4. The process of claim 3 wherein said aqueous medium contains phosphoric acid.

* * * * *